United States Patent [19]

Lemelson

[11] Patent Number: 5,177,645

[45] Date of Patent: * Jan. 5, 1993

[54] METHOD AND APPARATUS FOR GENERATING, STORING, REPRODUCING, AND DISPLAYING IMAGE INFORMATION

[76] Inventor: Jerome H. Lemelson, Suite 286, Unit 802, 930 Tahoe Blvd., Incline Village, Nev. 89451-9436

[*] Notice: The portion of the term of this patent subsequent to Jul. 15, 1997 has been disclaimed.

[21] Appl. No.: 770,601

[22] Filed: Oct. 2, 1991

Related U.S. Application Data

[63] Continuation-in-part of Ser. No. 363,121, Jun. 8, 1989, abandoned, which is a continuation of Ser. No. 933,251, Nov. 21, 1986, abandoned, which is a continuation of Ser. No. 158,286, Jun. 10, 1980, abandoned, which is a continuation-in-part of Ser. No. 225,173, Aug. 27, 1962, Pat. No. 4,213,163, which is a continuation-in-part of Ser. No. 668,348, Jun. 27, 1957, Pat. No. 3,051,777, which is a continuation-in-part of Ser. No. 544,991, Nov. 4, 1955, Pat. No. 2,959,636, and Ser. No. 515,417, Jun. 14, 1955, Pat. No. 3,003,109.

[51] Int. Cl.⁵ .............................................. H04N 5/78
[52] U.S. Cl. .................................... 360/35.1; 360/13; 360/27; 358/335; 358/344
[58] Field of Search .................. 360/35.1, 13, 10.1, 360/27; 358/313, 335, 342, 344, 345, 347, 348

[56] References Cited

U.S. PATENT DOCUMENTS

| | | | |
|---|---|---|---|
| 2,540,654 | 2/1951 | Cohen et al. | 235/61 |
| 2,611,813 | 9/1952 | Sharpless et al. | 177/353 |
| 2,679,035 | 5/1954 | Daniels et al. | 340/165 |
| 2,721,990 | 10/1955 | McNaney | 340/174 |
| 2,771,595 | 11/1956 | Hendrickson | 340/174 |
| 2,923,921 | 2/1960 | Shapin | 340/174.1 |
| 2,954,546 | 9/1960 | Burns et al. | 340/174.1 |
| 2,955,157 | 6/1960 | Young | 178/6.6 |
| 2,969,525 | 1/1961 | Hill | 340/174.1 |
| 2,988,735 | 6/1961 | Everett et al. | 340/174.1 |
| 3,012,227 | 12/1961 | Astrahan et al. | 340/172.5 |
| 3,037,192 | 5/1962 | Everett | 340/172.5 |
| 3,352,968 | 11/1967 | Walter et al. | 178/6.6 |
| 3,517,391 | 6/1970 | Lentz | 340/172.5 |
| B1 4,213,163 | 3/1991 | Lemelson | 360/35.1 |
| 4,213,163 | 7/1980 | Lemelson | 360/35.1 |

OTHER PUBLICATIONS

Pollard, The Design, Construction, and Performance of a Large-Scale General Purpose Digital Computer, Review of Electronic Digital Computers, Feb. 1952.

Nicola, R., and Gordon, B., A High-Speed Magnetic-Core Output Printer Proceedings of the Association for Computing Machinery, Sep. 8–10, 1952, pp. 6–9.

Frizzell, Clarence E., Engineering Description of the IBM Type 701 Computer, Proceedings of the I.R.E., Oct. 1953, pp. 1275–1287.

A Digital Computer for Scientific Applications, Proceedings of the IRE, Dec. 14, 1948, p. 1459 West and DeTurk.

G. G. Hoberg, The Burroughs Laboratory Computer, Review of Electronic Digital Computer, Feb. 1952, pp. 22–29.

New Products and Developments, Journal of the Society for Motion and Television Engineers, Jun. 1961.

Haneman and Ostrow, Television Tape Editing System Institution of Electrical Engineers, Jun. 1963.

Haneman, William, and Ostrow, Harvey, A New Digital System for Editing TV Tape RCA Engineer, Aug.-Sep. 1961.

Leiner, A. L., and Alexander, S. N., System Organization of the Dyseac, Transactions of the I.R.E., Mar. 1954, pp. 1–10.

Leiner, Alan, System Specification for the Dyseac*, Journal of the Association for Computing Machinery, Apr. 1954, pp. 57–81.

Fenimore, G. E., Data Transfer and Display Equipment for a Proposed System of Air Traffic Control Transactions of the American Institute of Electrical Engineers, 1955, pp. 145–155.

Primary Examiner—Andrew L. Sniezek
Attorney, Agent, or Firm—Steven G. Lisa

[57] ABSTRACT

Information signals including single frame video signals are recorded on selected areas of a recording medium, with accompany recorded code signals associated with each frame. Address codes are employed to locate and read the information signals stored on the recording medium. The information read from the recording medium is processed, stored in a display buffer, and displayed on a viewing screen.

76 Claims, 9 Drawing Sheets

METHOD AND APPARATUS FOR GENERATING, STORING, REPRODUCING, AND DISPLAYING IMAGE INFORMATION

CROSS-REFERENCES TO RELATED APPLICATIONS

This application is a continuation-in-part of application Ser. No. 363,121, filed Jun. 8, 1989, now abandoned which is a continuation of application Ser. No. 933,251, filed Nov. 21, 1986 now abandoned, which is a continuation of application Ser. No. 158,286, filed Jun. 10, 1980 now abandoned, which is a continuation-in-part of application Ser. No. 225,173, filed Aug. 27, 1962, now U.S. Pat. No. 4,213,163, which is a continuation-in-part of application Ser. No. 668,348, filed Jun. 27, 1957, now U.S. Pat. No. 3,051,777, which is a continuation-in-part of application Ser. No. 544,991, filed Nov. 4, 1955, now U.S. Pat. No. 2,959,636 and a continuation-in-part of application Ser. No. 515,417, filed Jun. 14, 1955, now U.S. Pat. No. 3,003,109.

BACKGROUND OF THE INVENTION

This invention relates to information storage systems, and more particularly to methods of recording information signals on selected areas of a recording medium and the playback of selected information signals for use, for example, as single frame presentations on a video display or as a motion picture.

Heretofore, video recording and reproduction has been limited in scope to the transducing on or from magnetic tape of a succession of frames in the form of a continuously generated video information signal produced by a video scanning camera during an extended period of time in which said camera is driven by a free running sync signal generator or is locked into and driven by power line alternating current. While this sufficiently serves the desired end of providing an elongated signal which is a motion picture recording of events as they occur, other realms of recording such as the fields of business record storage and animated cartooning, and the temporary storage of a record in the form of discrete signals defining different still image fields or frames cannot be accomplished by the conventional video tape recording and reproduction apparatus.

SUMMARY OF THE INVENTION

Hereinafter described are methods and apparatus for magnetically recording and visually reproducing information such as a document or a single page of a business record. This information is recorded on a moving recording member in a predetermined location thereon. Other information recordings are recorded in tandem on the record member. At a later time, when this information is to be referred to, a selector means such as a pushbutton, or dial selector or other controller is set to a code position or condition corresponding to the position on the record member at which the desired information is recorded, and reproduction of said information as an image on a display screen is effected by subsequent operations of the system occurring in a predetermined sequence. Initially, the record member is started and marker signals are reproduced or read by a pickup head. Said marker signals may be recorded at intervals along the record member and are provided thereon prior to subsequent information recording. The reproduction transducer or pick-up head for said marker signals transmits signals derived by reproducing said marker recordings to a location sensing means which has previously been set by the selector means. The location sensing means transmits a signal which is used to effect control of the playback or reproduction head to transduce or read during the interval that the selected information is opposite the playback head.

The selected information is retrieved from the record member and may be viewed on a visual display device of a monitoring means, which may include a separate storage device that refreshes the display at constant speed and having erasing, playback and recording functions associated therewith. The erase function may be activated to clear old information signals from the storage device. Then new information signals are transmitted from the transducer associated with the recording member to the storage device of the display, which records a single frame of video display information. The video display information recorded on the storage device is reproduced and transmitted to the visual display device which may be similar to a conventional home T.V. receiver. A Cathode ray tube of moderately low persistency may be used since said tube will be modulated by the same picture signal each time the storage device refreshes the display.

The recording operation is similar to the playback operation in that the information locating means is first initiated by dial means or pushbuttons so that recording will take place on a selected section of the record member. Then an erasing transducer will be activated to erase signals from the selected location of the record member. Next, a recording transducer will be activated to record the information signal.

The video storage system just described will greatly simplify the production of animated cartoons in that a succession of frames may be recorded on the record member in tandem to produce the complete cartoon and, as each frame is recorded, it may be monitored with any changes in that frame being made before subsequent frames are recorded. The monitored frame immediately visually indicates such variables as changes in subject location, size, color, shape, etc. If necessary the recently recorded frame may be erased and the newly positioned characters are recorded on that frame.

Conventional cartoon film may be used in conjunction with the present invention by using video tape as the storage medium, and by providing an optical system that will present identical images to a film camera and a video camera feeding the magnetic tape. First the image is recorded on the tape and monitored. When the positions of the characters have been altered to produce the desired image as viewed on the visual indicating device, the shutter of the film camera is activated to record the image on film.

This invention also contains aspects in the field of magnetic recording and reproduction apparatus and methods for transducing information with respect to magnetic tape contained in and supplied from a magazine.

Those aspects of this invention relate to an apparatus and method for transducing information with respect to a flexible magnetic tape by means of a magnetic transducer or a plurality of magnetic transducers which are rotated with respect to the tape to effect scanning of the tape. In a preferred form of the invention the magnetic tape is supplied from and returned to a magazine in which said tape is wound and stored. The plurality of magnetic transducers, which include at least one magnetic pick-up. are preferably mounted on a drum which is power rotated about its longitudinal axis to carry the pick-up in a scanning path across the tape which is guided across a portion of the surface of the drum and, after travelling partly around the drum, back into the magazine for take-up storage therein. Prior to the making of the instant invention it was known in the art to drive magnetic tape from a magazine against one or more stationary magnetic heads. Various operating and functional advantages may be derived from the instant invention which involves guiding and driving a magazine supplied magnetic tape around a select portion of the cylindrical surface of a rotatable drum in a circumferential direction and to cause the magnetic head or heads supported by the drum to scan the tape at higher speeds than would be derived by merely driving the tape past a stationary magnetic head or heads.

Accordingly, a primary object of this invention is to provide an improved video storage system wherein documents and business records may be stored.

Another object is to provide a novel method for the production of recordings which when played back yeild an animated sequence.

Another object is to provide a novel method of video storage wherein a single frame video signal is recorded on a predetermined location of an erasable storage means.

Another object is to provide a novel method of video storage wherein a single frame of information recorded on a selected location of an erasable storage means is viewed as it is recorded.

Still another object is to provide a novel means whereby cross indexing is accomplished to facilitate searching.

It is another object of this invention to provide a new and improved apparatus and method for reproducing information which is magnetically recorded along a flexible magnetic tape.

Another object is to provide an apparatus and method for reproducing signals recorded on magnetic tape by rotating a magnetic transducer against said tape to cause it to scan the recordings thereon.

Another object is to provide an apparatus and method for transducing information with respect to a magnetic tape stored in a magazine by removing the tape from the magazine and driving it in a select path exterior of the magazine past a magnetic transducing means.

Another object is to provide an apparatus and method for transducing recordings with respect to an elongated flexible magnetic tape employing a plurality of transducers supported by a rotating drum to scan the tape.

Another object is to provide an apparatus and method for transducing information with respect to a magnetic tape by guiding said tape against a portion of a rotating drum containing a plurality of transducers wherein the tape is supplied from and driven back into a housing or magazine.

Another object is to provide an apparatus and method for effecting video picture signal recordings on a magnetic tape supplied and fed from a magazine.

Another object is to provide an apparatus and method for recording still picture signals on magnetic tape supplied from a magazine and generating select still images from reproductions of selected of such signals.

Another object is to provide a storage system for a large quantity of information generated as separate groups or frames of information wherein each group may be selectively recorded along selected portions of a magnetic recording member such as a magnetic recording tape and may be selectively reproduced therefrom for display or other purposes.

The above and other objects are achieved by a method for recording information in a record member and for transducing selective portions of that information to respective monitorable still images. The method comprises the steps of (a) generating a first information signal, (b) recording the first information signal on a first portion of the record member, (c) generating and predeterminately recording a first code on the record member for locating and identifying the recording of the first information signal, (d) repeating the preceding steps to generate and record a plurality of additional information signals and respective codes, each code identifying and defining the location of a respective of the additional information signals, (e) selectively reproducing the code signal that identifies and locates the signal containing the selected information, and (f) employing that code signal to effect the selective application of its associated information signal to display means operable for generating images and employing that information signal to generate an image defining the information therein on the display. In a further aspect of the invention, a plurality of different codes are recorded, each of which define information contained in one of the recorded information signals, and each of which codes differs from the others and is related to a different characteristic of the associated information signal. For example, the plurality of different codes can be used for cross-referencing the recorded information signals or for identifying particular subject matter contained in the recorded information. If desired, those additional codes may operate to effect reproduction of the information signal.

The above and other objects are also achieved by a method of recording codes along areas of a code-recording portion of a record member and recording information adjacent to the code-recording portion. That method comprises the steps of: (a) relatively moving the record member and a transducing device including code-recording transducers, (b) generating feedback signals by reading codes recorded on the code-recording portion of the record member, (c) comparing the feedback signals with a select address code, and (d) when a match occurs generating a control signal to activate and control a generating means to generate and record a selected code on a selected area of the record member.

The above and other objects are also achieved by an apparatus for storing, reproducing, and displaying visual information. That apparatus comprises: (a) first means for storing visual information as a plurality of discrete recordings of signals defining frames of still images, (b) second means for selectively reproducing selected ones of the discrete recordings and generating electrical signals representative of the selectively reproduced recordings, (c) third means including a display having a viewing screen with a short persistence phosphor image generating means requiring restorative information-signal scanning at a fixed rate to maintain an image of such information on the viewing screen to permit the image to be visually monitored, (d) fourth means connected to the display for receiving and storing signals generated by the second means, (e) fifth means for reproducing signals stored by the fourth means at a fixed frequency equal to the restorative information signal scanning rate required to maintain an image on the viewing screen of the display, (f) sixth means for transmitting signals reproduced from the fifth means to the display to effect the generation and retention of images on its viewing screen for a sufficient period of time to permit a person viewing the screen to visually monitor the information defined by the signal selectively reproduced from the first means, and (g) seventh means for controlling the operation of the fifth means to cause it to erase signals recorded in the fourth means, thereby permitting new information signals to be selectively reproduced from the first means by the second means and applied to the fourth means and to be reproduced therefrom and employed to effect generation of respective still images on the display.

In another form of the invention, the above and other objects are achieved in a method of storing, reproducing, and displaying video information comprising: (a) storing information as a plurality of discrete recordings at selected frame storage locations of a video storage means, and (b) when it is desired to visually read and study the information contained in a selected frame location, selectively reproducing the recording from the selected frame location and generating electrical signals representative of such recording, (c) passing the reproduced electrical signals to a further signal storage means and storing a representation of the information defined by the electrical signals in the further signal storage means, (d) thereafter generating further electrical signals representative of the selectively reproduced recording by repeatedly reproducing at a fixed frequency the further electrical signals from the signals stored in the further storage means, and applying the further electrical signals generated by reproduction from the further storage means to a display having a viewing screen defined by a short persistence phosphor image generating means in which the frequency at which the further electrical signals are generated is such as to effect the retention of a still image on the viewing screen of the display by the repeated scanning of the phosphor image generating means of the screen, which image is a video representation of the information contained in the recording reproduced from the selected frame storage location of the storage means.

With the above and such other objects in view as may hereafter more fully appear, the invention consists of the novel construction, combinations and arrangements of parts as will be more fully described and illustrated in the accompanying drawings, but it is to be understood that changes, variations and modifications may be resorted to which fall within the scope of the invention as claimed.

Figure 1:
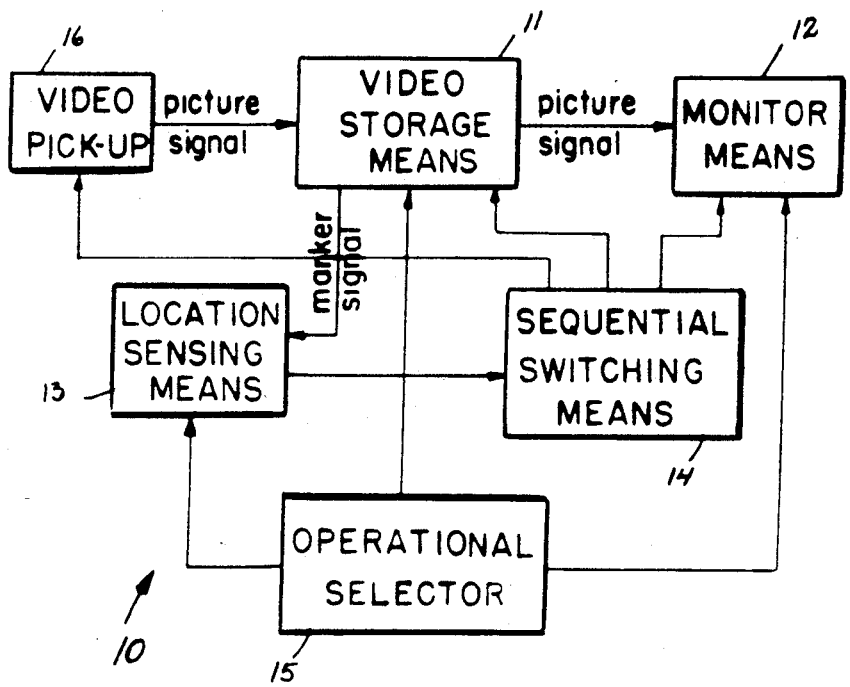
FIG. 1 is a schematic block diagram of an automatic recording and reproduction system which may be utilized for the storage and reproduction of document information.

Referring to the block diagram of FIG. 1, the video storage system 10 comprises an operational selector 15 for selecting the mode of operation of the system 10. Signals from operational selector 15 are fed to video storage means 11, monitor means 12 and location sensing means 13 to initiate system operation. Marker signals are transmitted from video storage means 11 to location sensing means 13 which generates a sync signal at the instant the marker signals correspond to a preset condition of the presettable locating means 13. The sync signal is fed to the sequential switching means 14 the multiple variable delay outputs of which are respectively transmitted to video pickup 18, video storage means 11, and monitor means 12 to control their sequence of operation.

Figure 3:
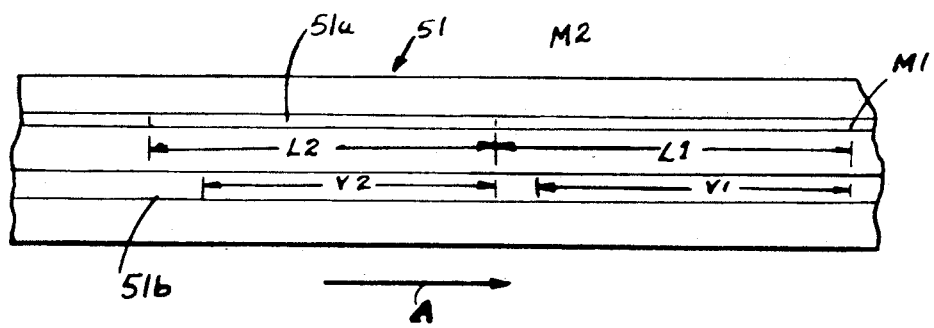
FIG. 3 is a plan view of a portion of a card or recording tape showing longitudinal primary information and frame locating signal information recorded thereon.
Figure 2:
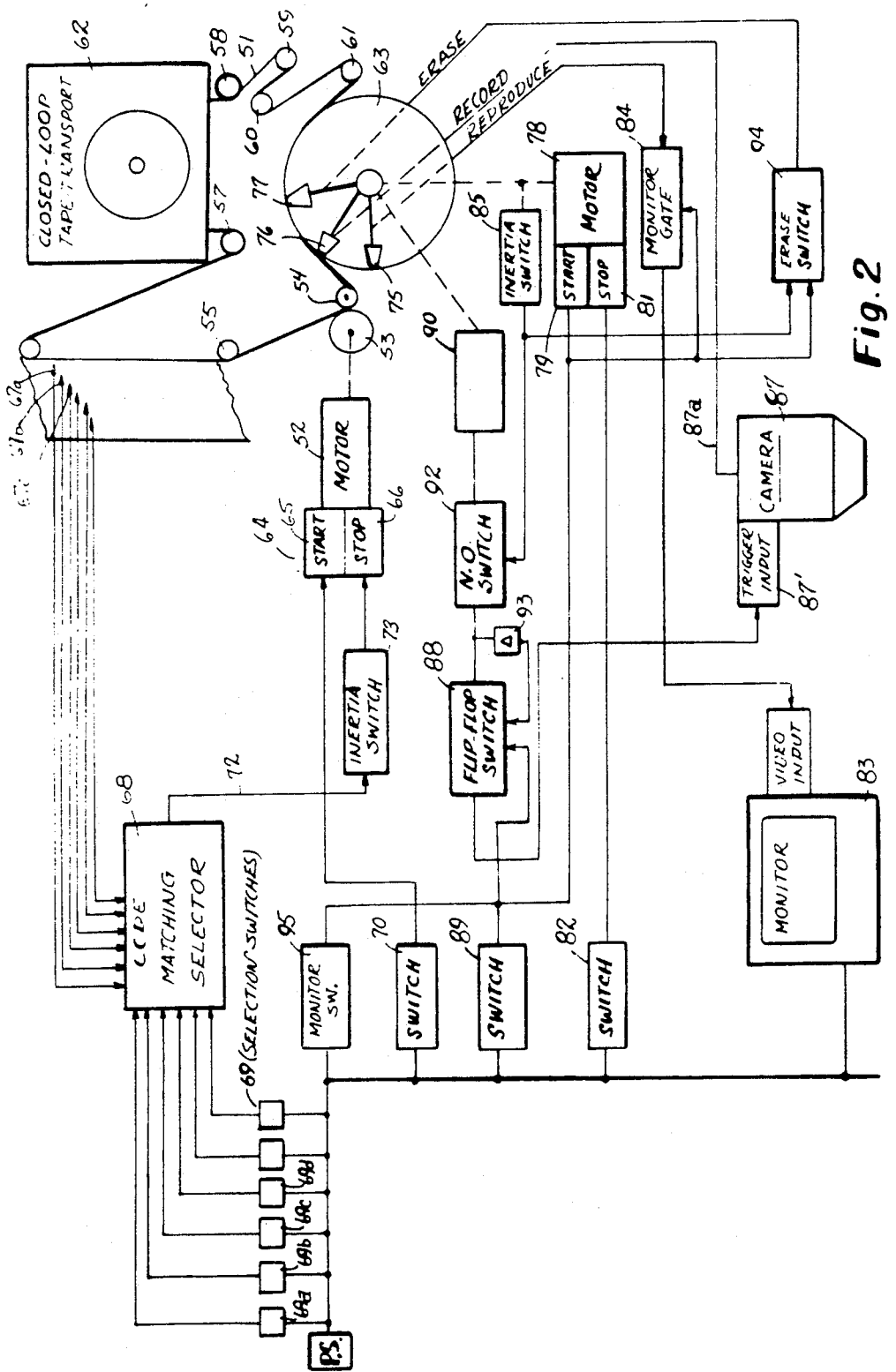
FIG. 2 is a schematic diagram of a first embodiment of the invention employing a closed loop taped transport.

Referring to FIGS. 2 and 3 a closed loop tape cartridge transport system generally designated 50 is used for the positioning of video storage medium or magnetic recording tape 51 which is driven in the direction indicated by arrow A. Motor 52 drives tape 51 through frictional engagement with a capstan 53 and an idler roller 54 over a closed path defined by a plurality of idlers 55-61, a transport or magazine 62 and a drum 63 constructed of non-magnetic material. Since the tape 51 travels through a closed loop, the motor controller 64 need only have a forward start control 65 and a stop control 66.

As seen in FIG. 3 tape 51 has one or more longitudinal marker channels 51a and one or more video channels 51b extending parallel to the marker channels. Video signals V-1, V-2, etc., are recorded on tape lengths L-1, L-2 respectively which are arranged in tandem on tape 51. Video signals V-1, V-2 do not run the full lengths of L-1, L-2 respectively for a reason to be hereinafter fully explained. Associated with each length L-1, L-2 are markers M-1, M-2 respectively recorded on the one or more marker channels 51a which will identify a particular of the lengths L-1, L-2.

The marker or code signals recorded on marker channels 51a are read by marker pickup heads 67a, 67b, 67c, etc., which are positioned in the vicinity of idler 56. The signals received by marker pickup heads 67 are transmitted to a location sensing means which is a presettable comparator or code matching device, 68 which has been conditioned by selector switches 69a, 69b, 69c, etc., which form a keyboard or other device. Comparator device 68 may be of the digital type described in detail in application Ser. No. 626,211 filed Dec. 4, 1956. Alternatively, code matching device 68 may comprise a device of the pulse counting type commonly known as a presettable, predetermining counter which will generate a control signal when a preset uncount condition has been reached in response to feedback signals generated in scanning the marker signal recordings on tape 51.

Selectors 69 are set so that the tape length L having the desired video signal V recorded thereon, or on which length L a new information signal is to be recorded, will be positioned between depressor roll 54 and idler 61 with marker M being close to idler 61 when motor 52 is stopped. The operation which achieves this proceeds as follows:

1. Tape transport motor 52 is started by transport switch 70 which sends a signal through line 71 to the forward control 65 of motor controller 64.

2. As tape 51 moves, marker pickup heads 67 read marker signals M and transmit the resulting code to presettable code matching device 68 until such time as the code signal of marker M coincides with the code setting of selector 69.

3. At that instant, the presettable code matching device 68 transmits a signal through line 72 to stop control 66. Thus the power for transport motor 52 is automatically turned off.

4. However tape 51, because of its inertia and the inertia of closed loop transport 50, will continue to move until the inertia energy is spent, at which time the desired length L will be positioned between depressor roll 54 and idler 61 to follow the curvature of drum 63.

It may be desirable to insert a normally open switch 73 in line 72 so that the signal transmitted from the presettable code matching device 68 will not reach stop control 66 unless motor 52 is up to speed thereby assuring a uniform coasting distance for tape 51. Switch 73 may be an inertia switch riding on the rotor of motor 52.

Drum 63 is mounted on shaft 74, having secured thereto a video pickup head 75, video recording head 76, and erasing head 77 together with an associated slip ring (not shown) for each head with heads 75–77 being positioned within drum 63 and close to the surface thereof. Brushes (not shown) are in contact with the slip rings to transmit signals to and from heads 75–77. Head motor 78, when energized through the start forward control 79 will cause shaft 74 to rotate clockwise with respect to FIG. 2, or in the direction of arrow B. Shaft 74 rotates until such time as stop control 81 is manually actuated by stop switch 82 or automatically actuated by video camera 87 in a manner to hereinafter be fully explained.

Pickup head 75 reads video signals V on length L positioned over drum 63 and transmits reproduction of these signals to monitor means 83 through normally open monitor gate 84 which is closed by a signal from inertia switch 85 when head motor 78 is up to speed. Monitor means 83 may include a storage tube whose face, after being scanned once by a modulated "write-beam" will retain the image thereon for a number of minutes or until such time as the erase switch 86 is actuated. Many well-known storage tubes such as those described in the text, "Storage Tubes" by Knoll and Kazan, may be used.

Video picture signal recording head 76 is energized by the picture signal output of video camera 87 which may be of the type used for conventional television transmission wherein the image field I is scanned twice for each frame to produce an interlace pattern, or the video camera 87 may be of a type that scans the image field I but once each frame. The video signals from camera 87 are also fed through a clipper and delay means 96, such as a pentode clipper adapted to pass only the frame vertical sync signal at the trailing edge of the frame composite video picture signal to actuate stop control 81.

Video camera 87 is controlled by a camera actuator 88 which is conditioned by signals originating from recording switch 89 and shaft position switch 90. Camera actuator 88 is a bistable switch of the type that will pass an input signal to one of two output circuits depending on the condition dictated by the last switching input and will continue to pass signals to this circuit until such time as a new condition is set up by other switching signals.

In the instant application, camera actuator 88 includes a first output circuit thereof feeding a signal through line 91 to trigger input 87' of video camera 87 while a second output circuit thereof is open.

Signals will pass through the first output circuit after recording switch 89 has been energized or actuated while the second output will be active after the camera actuator switch 88 has been conditioned by a signal from shaft position switch 90.

Shaft position switch 90 may be a micro-switch actuated by a pin or cam projection not shown on shaft 74. For each revolution of shaft 74, switch 90 is actuated to indicate that the video recording head 76 has just passed a predetermined point in its rotation and is opposite a predetermined point in the length of tape 51 between said guide rolls 54 and 61. A signal output is produced when switch 90 completes a circuit with a power supply, not shown. Said signal output may be used to effect recording of the desired video frame signal on said predetermined length of tape 51 as follows. When motor 78 is operating at a speed to rotate the recording transducers 75, 76 and 77 secured to drum 63 at the desired recording velocity, inertia switch 85 operates to close normally open switch 92. When switch 92 has been closed, the output signal of switch 90 will be passed through switch 92 to two circuits. The first circuit passes said output signal directly to a first signal input of camera actuator switch 88. The second circuit includes a delay line 93, through which said output signal passes, to a second switch of input 88. When said output signal goes to the second switching input 88, after said output signal of switch 90 has passed through said first signal input of switch 88, to line 91, switch 88 is switched so that successive signals from switch 90 will not be passed to line 91. The signal passed through switch 88 is transmitted to the trigger input 87' of camera scanner 87 and is used to initiate the scanning sweep of the video tube in the camera. The resulting video picture signal output, which may be a composite video picture having blanking plus sync signals combined therewith, is passed over cable 87a to the recording head 76 and to a clipper circuit 96.

Signals will pass through the first output circuit after recording switch 89 has been activated while the second output will be active after camera actuator switch 88 has been conditioned by a signal from shaft position switch 90.

As stated, shaft position switch 90 may be a microswitch actuated by a protrusion (not shown) of shaft 74. For each revolution of shaft 74, switch 90 is actuated to indicate that the video recording head 76 has just passed depressor roll 54. Signals from shaft position switch 90 must pass through normally open switch 92 which is closed by inertia switch 85 after drum motor 78 is up to speed. After passing through switch 92, the signal from switch 90 first acts as the input signal to camera actuator switch 88. Passing through delay element 93, the signal from switch 90 acts as the switching signal to open camera actuator switch 88 so that there will be no output from camera 87 after one frame is complete.

When recording switch 89 is actuated, switch 88 will be conditioned to pass an input signal to video trigger input 87' via line 91. The next input signal to switch 88 will be the signal from shaft position switch 90 occurring after head motor 78 has reached operating speed since until this time switch 92 has been open. This signal is transmitted to video trigger input 87' which causes the scanning beam of 87 to scan an image field in less time than it takes video recording head 76 to travel tape length L. Before a second signal has passed through switch 92, the first signal has passed through delay element 93 to open actuator switch 88.

Viewing of the information recorded on a given tape length L may take place without simultaneously recording, by actuating monitor switch 95 which starts head motor 78 without conditioning camera actuator switch 88. It should now be apparent that the video signal V does not take up a full tape length L since the stopping of the tape by coasting is not the most precise positioning method. Furthermore, flyback time is required between video frames if they are to be played back in succession as a movie.

Erase head 77 is controlled by erase switch 94 which is only closed during the interval between the actuation of recording switch 89 and the time that the head drive motor 78 reaches speed as evidenced by a signal from inertia switch 85. Since inertia switch 85 also controls video recording, video camera 87 cannot be activated until erase head 77 has been deactivated.

Pickup head 75 is positioned counterclockwise of recording head 76 so that video signals V are monitored substantially at the instant they are recorded, thereby overcoming a most objectionable feature of photographic recording. That is, in conventional photographic film storage devices there is a delay between the time that the information is recorded on the storage medium and the time that the information can be monitored or viewed. In addition, if an error has been made in the photograph or the information becomes obsolete this section of film cannot be reused whereas video recording on magnetic tape permits faulty recordings to be instantly erased without destroying the storage medium.

It is to be understood that, for the sake of clarity amplifiers associated with the various heads, 75-77 have been omitted. For the same reason, the illustration of power supplies has been omitted from the drawings and it is assumed that sufficient power means are provided on the correct side of all switches and controls.

Figure 4:
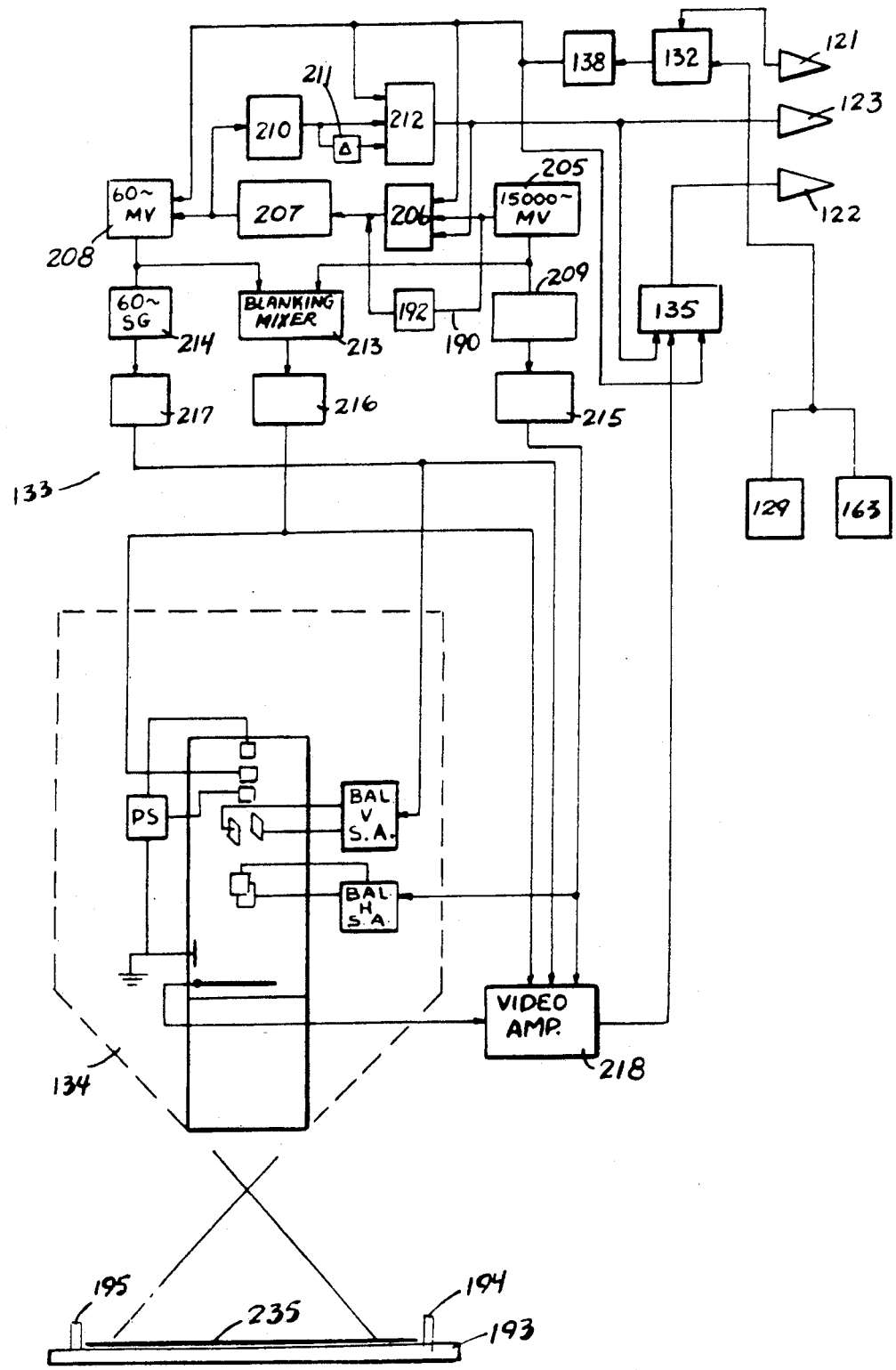
FIG. 4' is a schematic diagram showing subsystem means for generating a single frame of information by means of a video camera.
Figure 4A:
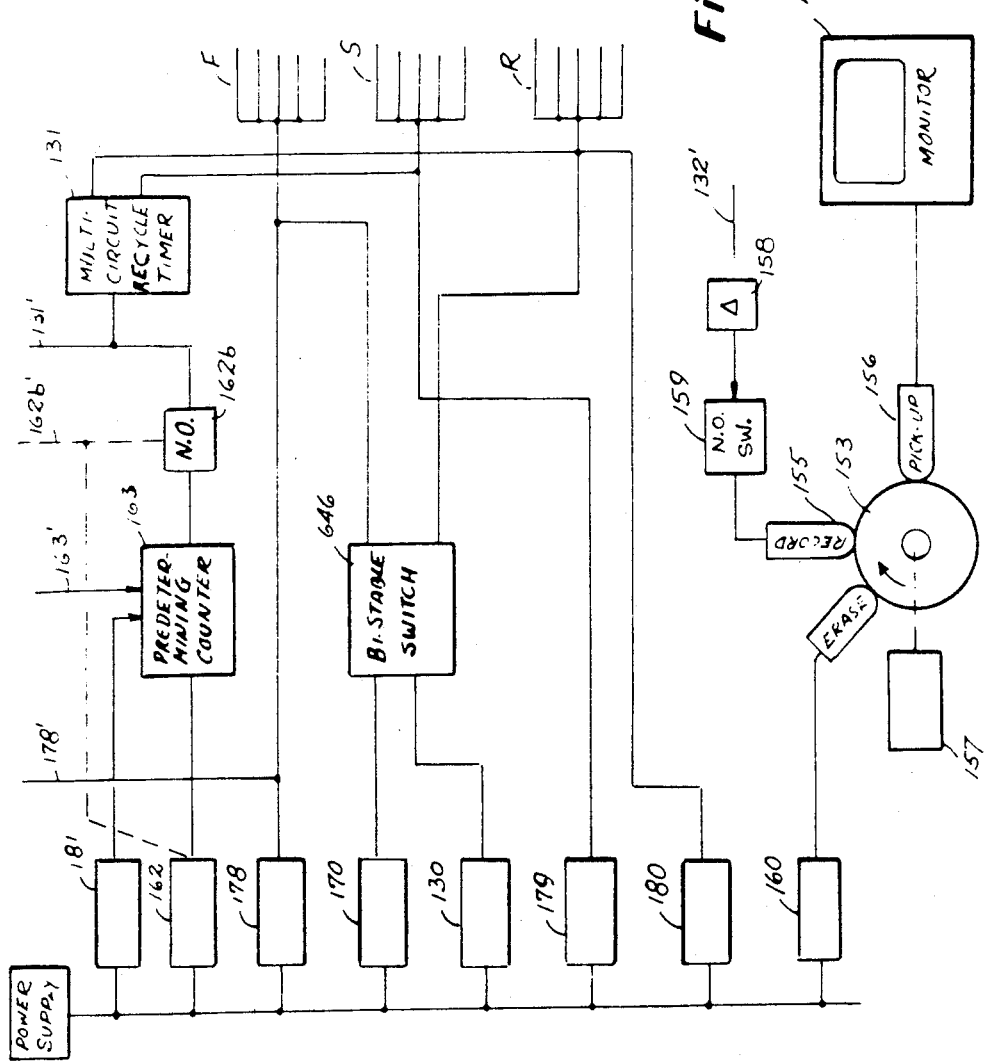
FIGS. 4a and 4b illustrate a schematic diagram of a second embodiment of the invention employing the recording of information signal along a longitudinal track of an elongated magnetic tape, wherein FIGS. 4a and 4b interconnect, as indicated, at the commonly designated conductors with FIG. 4a disposed generally below FIG. 4b.
Figure 4B:
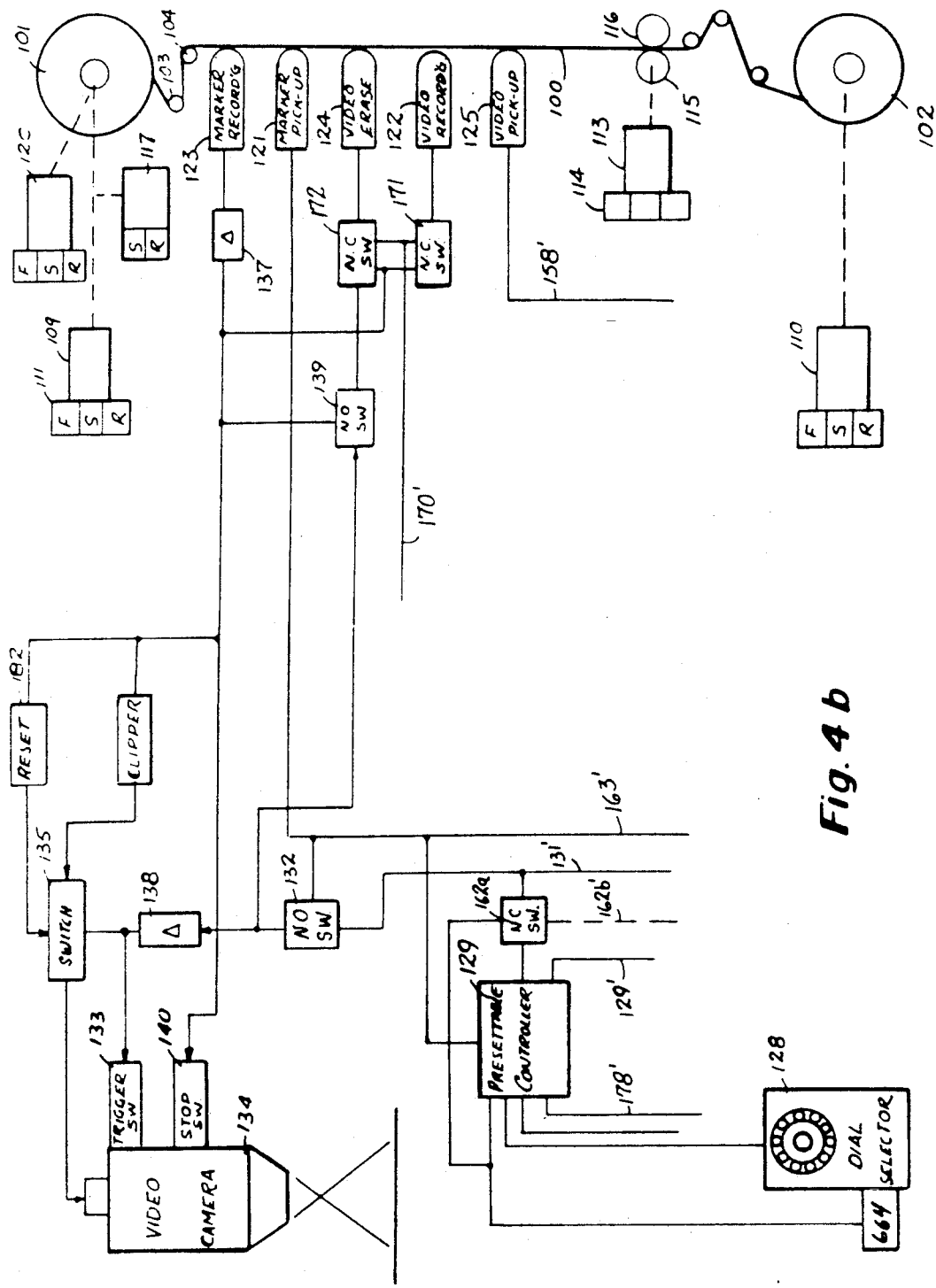
Figure 5:
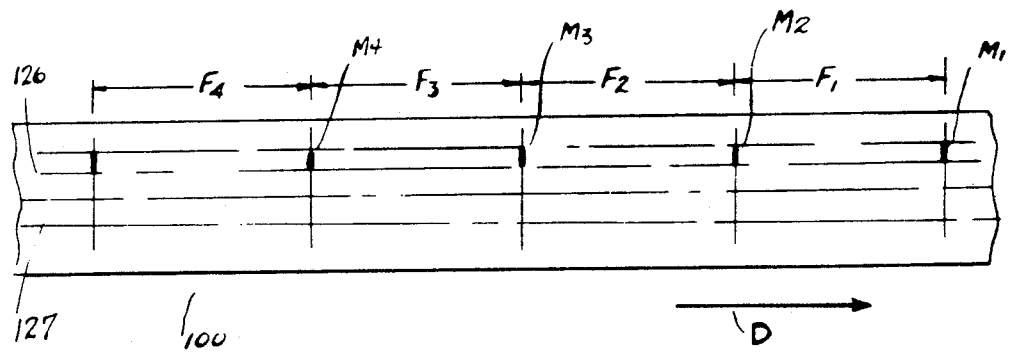
FIG. 5 is a plan view illustrating record and code signal applicable to the system illustrated in FIGS. 4a and 4b.

Referring more particularly to FIGS. 4a, 4b and 5, a second embodiment of my invention is illustrated wherein the magnetic storage medium is in motion during the recording and playback operation. Magnetic recording medium or tape 100 is fed between take-up reels 101 and 102 and is guided therebetween by idlers 103–108. Reversible motors 109 and 110 drive reels 101 and 102 respectively and are controlled by motor controllers 111 and 112 which have three inputs for controlling and effecting forward, stop, and reverse movement of their respective motors. With the controllers 111, 112 in the forward condition tape 100 will move in the direction indicated by arrow D while in the reverse condition tape 100 will move in the opposite direction. Brakes 117, 118 provide dynamic braking means for reels 101, 102 respectively.

The actual driving of tape 100 is accomplished by constant speed motor 113 having motor controller 114 associated therewith. Capstan 115 connected to the output of motor 113 is in frictional engagement with one side of tape 100 while depressor wheel 116 on the opposite side of tape 100 provides a support for capstan 115. Constant power supply brake 120 senses the tension in tape 100 and maintains the same reasonably constant by regulating the speed of reel 101.

The tape drive system just described is typical of the art and is more particularly described in the R.D.A. Review Vol. XVII, September 1956, No. 3, pages 365–373.

Frame indicating or marker pickup head 121 is longitudinally aligned along tape 100 adjacent to marker channel 126 of tape 100 arranged in tandem with frame indicating marker recording head 123. In a line parallel to heads 121, 123 are video recording head 122, erase head 124, and reproduction head 125 which are coupled to video channel 127.

Recording of a signal proceeds as follows when the tape 100 is being driven in the forward direction, which is the direction indicated by arrow D, and the tape frame F on which the recording is to take place is behind the tape frame opposite marker pickup head 121; that is, if marker pickup head 121 is at frame $F_3$ recording will take place on a higher numbered frame sufficiently far behind to permit the tape 100 to attain operating speed.

Dial selector 128, is placed at a setting corresponding to the frame F on which recording is to take place to set up presettable code matching device or pulse counting device 129, the detailed construction of which shall be hereinafter fully explained. Switch 130 is actuated to start rotation of tape drive motors 109, 110, 113 in the forward direction to drive tape 100 in the forward direction. Marker pickup head 121 reads marker pulses M and transmits each pulse to pulse counting device 129 which goes through an uncounting process until such time as a predetermined number of marker signals M pass marker pickup head 121. At this time, pulse counting device 129 will feed a control pulse to close switch 132 which is a normally open switch having an instantaneous closing and time delayed opening characteristic with the time delay interval being slightly less than the time it takes one tape frame F to pass a given point. However, normally open switch 132 will remain open for a sufficient interval of time to allow the pulse generated by marker pickup head 121 after the pulse that uncounted pulse counting device 129 attains its zero condition, to pass through delay device 138 to the start control 133 of video camer 134 to thereby cause the read beam thereof to scan image field 135. The signal passing through switch 132 will also pass undelayed to close normally opened switch 139 which controls erase head 124, which is positioned opposite marker pickup head 121. Switch 139 remains closed for the time it takes a tape frame length F to pass a given point when the tape is moving at operating speed. Delay device 138 compensates for the longitudinal distance between erase head 124 and video recording head 122.

The pulse passing to camera start control 133 also conditions switch 135 to pass video signals from video camera 134 to a clipper differentiator 136 and video recording head 122 which records the video signal on video channel 127 of tape 100. Bistable switch 135 alternately opens and closes as switching pulses are received from marker pickup head 121 and clipper differentiator 136. Clipper differentiator 136 clips the lower amplitude video signals and transforms the frame vertical sync signal at the end of a video frame to a discrete pulse which is used to close switch 135 and, in a system that records its own marker pulses on tape 100, also passes said clipper signal to marker recording head 123 through delay line 137 which delays the pulse for a length of time equal to the time interval between frames in conventional television transmission and the time it takes a point on the tape to travel the longitudinal distance between heads 122 and 123. The signal from clipper differentiator 136 also passes to stop switch 140 of video camera 134 and is effective to condition the read beam thereof, to begin the next scanning of the image field 135.

The zero or control pulse fed by the pulse counting device 129 to normally open switch 132 is also fed to a multi-circuit self resetting cycle time 131 which comprises a plurality of time delay elements (not shown) so arranged that after recording is effected on the selected frame, the tape drive motors 109, 110 are stopped and then reversed. The tape drive motors are stopped thereafter such that the tape is at a point a predetermined number of frames in advance of the frame on which recording has just take place so that the tape will be able to accelerate to recording speed in the distance to the frame following the frame on which recording has just take place. The final stopping operation is controlled by stop counter 654 operating in a manner to be hereinafter described.

Monitor means 150 comprises a viewing device 151, which may be a conventional video receiver, including a viewing tube or screen, and a rotating magnetic recording drum 153, having associated therewith, monitor erase head 154, monitor recording head 155, and monitor pickup head 156. The circumference of drum 153 is equal to or slightly larger than the distance required to record a single frame or video picture signal thereon at said video recording speed and the drum 153 is driven at a constant speed by synchronous motor 157 so that picture tube 152 may be of low persistence. Thus with each revolution of drum 153 the write beam of picture tube 152 will be modulated thereby and renew the single frame screen presentation.

Video pickup head 125 transmits video signals reproduced from tape 100 to monitor recording head 155 through normally open switch 159. The marker pulse passing switch 132 after passing through time delay element 158 closes switch 159. Switch 159, once closed, remains in this condition for the interval of time required for a tape frame length F to pass a fixed point. Delay element 158 provides a time delay interval to compensate for the longitudinal distance between marker pickup head 121 and video pickup head 125 so that part of the prior signal on 100 will not be passed to 155. Video signals recorded on rotating drum 153 are read by monitor pickup head 156 and transmitted to monitor viewing tube 151 on which an image is generated.

Push button switch 160, when closed, energizes monitor erase head 154 and is preferably actuated before actuating the start switch 130 which originates system operation.

When tape 100 is stopped a predetermined number of frames in advance of the frame F on which recording has just taken place as determined by the stop counter 654, recording on the following frame may occur in one of two ways. Switch 130 may be actuated with operation taking place by means of the control or zero signal transmitted by presettable pulse counter 129 or switch 162 may be actuated to effectively cut out or deactivate presettable pulse counter 129 and insert the cartoon counter 163 into the system.

Switch 162 is a normally open section of a triple pole double throw switch having another normally open section 162b in the output of cartoon counter 163 and a normally closed section 162a in the output of the presettable pulse counter 129. Sections 162, 162a, 162b remain in their other than normal positions for an interval slightly longer than the time required for cartoon counter 163 to uncount and transmit a zero signal which performs the same functions as the zero signal of presettable pulse counter 129 as heretofore explained. Cartoon counter 163 is a self recycling or resetting predetermining counter and relay which once activated by closing switch section 162, will generate a control signal after counting a predetermined number of pulses such that recording or reproduction will take place on the next frame F. Recordings may be thus effected on successive frames without resetting dial selector 128. Cartoon counter 163 is self resetting.

Reproduction from a selected frame proceeds by operating switch 160 to clear drum 153 of signals, setting dial selector 128, and then operating switch 170. This will send signals which open normally closed switches 171 and 172 thereby opening the circuits to video recording head 122 and erase head 124 respectively. The apparatus will operate as during the recording process but erase head 124 and video head 122 will not be activated. However, pickup head 125 will read information recorded on the selected frame and transmit it to monitoring means 150 where it may be viewed. Switches 171 and 172 will be returned to their normally closed position by the signal output of clipper differentiator 136.

Switches 178-180 are provided for manual operation of the motor controllers to their start, stop, and reverse positions respectively. If a new operation should be desired or the apparatus has been stopped before cartoon counter 163 has uncounted, said counter may be manually reset by switch 181. Similarly switch 182 serves as a manual reset for bistable switch 135 to return it to its normally open position. The bistable switches above referred to may comprise vacuum tube switching circuits typical of the computer art. However, the tape drive of the instant invention is reasonably slow so that latching relays will give satisfactory performance.

As noted in the introduction, my system will greatly simplify the production of animated cartoons. This is accomplished by operating the apparatus hereinbefore described in the following manner.

1. Provide a first image in the field of a video camera by arranging characters and background elements in a desired configuration.
2. Scan this image with the scanner forming part of the video camera to produce a recordable signal at a recording head,
3. Cause relative movement between the recording head and a first length of magnetizable recording tape with respect to the longitudinal axis of the tape at a rate of movement to be used during playback,
4. Record the signal on this length of tape,
5. Stop the relative movement,
6. Provide second and successive images in the field of the video camera as set forth in step 1 above to represent the appearance of the first image elements at later, discrete and discontinuous second and successive instants in time,
7. Reestablish the relative movement between tape and recording head and otherwise repeat steps 2 through 4 above for each image field established to record these images on adjacent tape lengths to yield a sequence of adjacent magnetically recorded and reproducible representation of these images on the tape, and
8. Play back from the tape so that adjacent frames are reproduced at substantially equally spaced intervals of time to produce an animated sequence of visible images.

A recording on conventional photographic film may be made at the same time without the necessity of subsequent editing being all but eliminated. This is accomplished by taking single frame photographs on successive film lengths using the video monitor as the source of the image being photographed. Naturally photographs are taken only after a desired image is displayed on the monitor.

It should be apparent to those skilled in the art that the magnetic tape and associated head having longitudinal relative movement as hereinbefore described may readily be replaced by a magnetic tape and associated heads wherein a combination longitudinal and transverse relative movement is utilized. In the latter system, the information is recorded on a plurality of channels oblique to the longitudinal axis of the tape thereby achieving slower tape speeds. Such a system is utilized in the Ampex Video Tape Recorder described in the August, 1956 issue of Electronic Industries published by Chilton Co., Inc.

It is noted that the means of FIGS. 2, 4a and 4b utilized for indicating tape frame positions by recording spaced apart pulses on a channel of the tape 100 other than that on which the video picture signal is recorded, may be replaced by signal means recorded on the same channel on which said video signals are recorded. Marker pulse signals may be provided at the beginning of each video picture signal or the frame vertical sync signal present in the composite video signal may be clipped therefrom and utilized for the purposes described.

FIG. 4' shows schematically details of the video camera scanning deflection circuit and the associated control and switching means for effecting scanning of the image field 135 and producing a composite video frame picture signal in a condition for recording.

FIG. 4' illustrates a deflection circuit for the video camera 134 of FIGS. 4a and 4b and the associated switching means or camera actuator 133 of FIGS. 4a and 4b. The switching circuit or controller 133 may also be employed in FIG. 2 for the switching means referred to by the numerals 88 and 87'. The video camera 134 illustrated is a cathode ray device employing electrostatic deflection although any other type may be employed for the purpose.

The pulse passed through delay element 138 is passed over several circuits including the "switch closing" input of a first bistable electronic switch or gate 212, a "closing" switching input into a second bi-stable electronic switch 206, and a trigger input to a 60 cycle multi-vibrator 208 which heads the vertical deflection chain of the deflection circuit associated with the scanning beam of the camera 134. The pulse to the switch 206 closes said switch and completes a circuit between the output of a 15,000 cycle free running multi-vibrator 205 and the signal input to a counter 207. The pulse to 208 triggers and drives said multi-vibrator causing an immediate output therefrom to the conventional illustrated 60 cycle signal generator 214 and the blanking mixer 213 of the deflection circuit. The output of 214 is produced as the frame vertical sync signal and passed through the vertical sync amplifier 217 from which it passes to the camera beam deflection circuits illustrated, and is used to bring the scanning beam to its starting position in the scanning or image field defined by 235 after which said beam is controlled in a defined scanning sweep by the other deflection control circuits illustrated. The output of 217 is also passed to the video amplifier 218 to be combined therein with the picture signal resulting from the scanning and the horizontal sync and blanking signals to provide a composite video signal output. The camera and deflection circuits are conventional closed circuit television control circuits and are described in detail in the text "Elements of Television Systems" by George E. Anner published by Prentice Hall. In this reference, the counter 207 is a 250 to 1 pulse counter producing a pulse output at 60 cycles per second when connected to the 15000 cycle free running multi-vibrator.

Thus, one sixtieth of a second after the appearance of the selected frame marker-pulse reproduction at the output of 138,218 produces an output which is passed to 108 to provide the next vertical sync pulse for returning the scanning beam to its starting position in the image field, and, for faster scanning, the second sweep of the image field starts whereby the picture signal output is continued to the video amplifier 218.

The output of 207 is also passed to a counter 210 which produces a pulse output upon receipt of at least two pulses from 207. The output of 138 is passed through the closed gate 212 and is used to open said gate 206 after passing therethrough to the "open" switching input to 206. Thus further signals from the 15000 cycle multi-vibrator 205 are prevented from passing to the counter so that it will remain in a reset condition for the next recording cycle. The pulse output of 207 is also passed through 212 to the marker pulse recording head 123 to indicate the position of the signal just recorded and for use, as described in recording the next video signal on 100. The output of 210 is passed through a delay line 211 to the "open" switching input of switch 212 thereby breaking the circuit between 210 and recording head 123. The output of 212 is also passed to the "open" switching input of the switch 135 in the output of the video amplifier 218 thereby preventing the passing of any signals therefrom to the picture signal recording head. For cartooning operations or the like, the counter 210 may be adjustable to produce an output signal after any number of predetermined inputs thereto from 207. This is provided in the event it is desired to maintain a still image in a motion picture recording for an extended period of time such as the image of a printed title or to create a condition of suspended animation. In order to view and evaluate or adjust the scanned field 235 on the image field of the monitor screen 152, a circuit 190 is provided which bypasses the switch 206 and connects the multi-vibrator 205 with the input to 207. A manual switch 192 is provided in the circuit 190 for opening and closing said circuit. It is assumed that the counter 210 is not only self-resetting after reaching its predetermined or preset count, but is also provided with automatic resetting means operated a time interval after the input to the counter stops so that regardless of the period of time the circuit 190 is completed, the counter 210 will automatically reset for the next recording operation.

Figure 6:
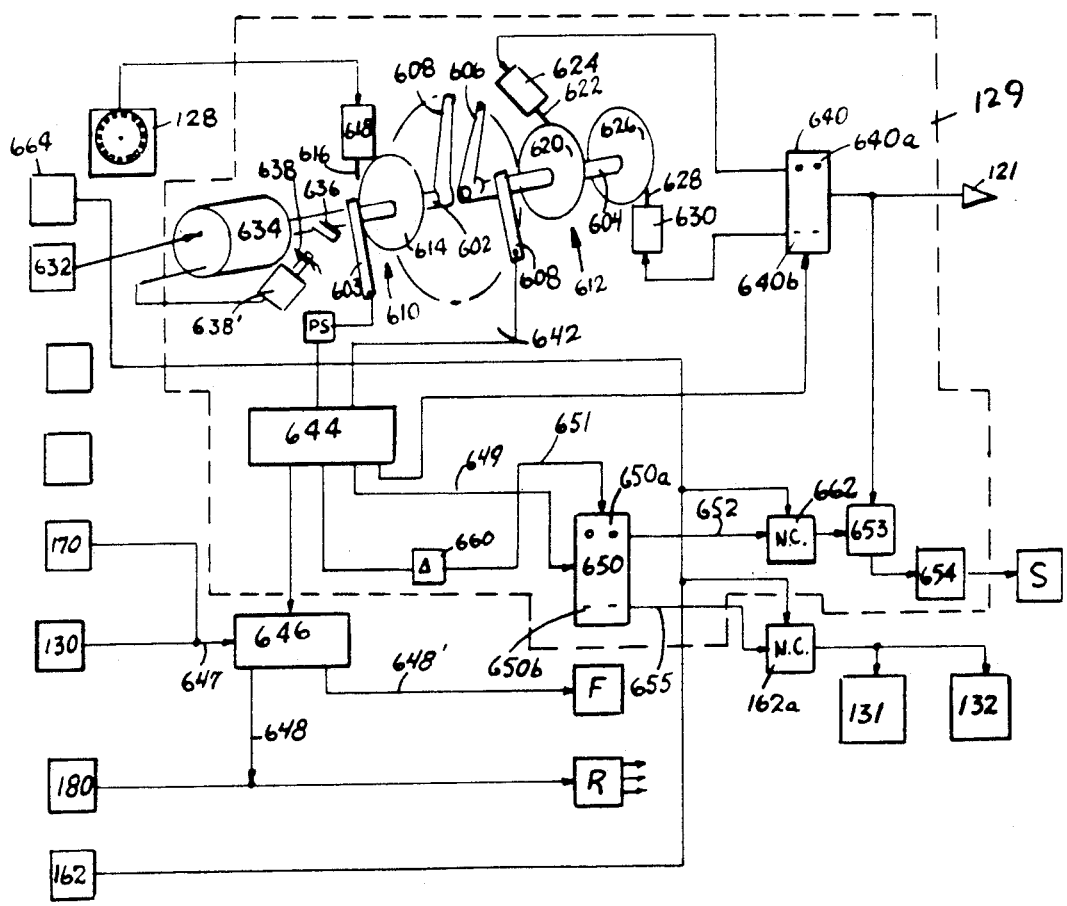
FIG. 6 is a schematic diagram illustrating one form of tape controller for predeterminately controlling the movement of the magnetic tape of FIGS. 4a and 4b during either a recording or reproduction operation to cause a selected frame of the tape to become operatively located with respect to magnetic transducers.

FIG. 6 is a schematic diagram showing a positional controller which, in the control system of FIGS. 4a and 4b, will perform the functions of the control unit referred to by the notation 129. The controller 129, which is a positional computer capable of indicating by an output signal when a predetermined section or length of the tape is a predetermined distance from or opposite one of the transducing heads, operates by the relative rotation of two aligned shafts 602 and 604. The shaft 602 is stepped from a predetermined or zero angular position through a selected counterclockwise angular motion in movement comprising a selected number of unit angle increments, said angle being proportioned to the length of said tape which is moved past said heads from the first frame thereof to the frame on which said selected frame is located for transducing on or from. The shaft 604 is adapted to rotate, as the tape 100 moves, an angle defined from said zero angle which is proportional to the degree of motion of the tape 100 past the transducing heads.

Secured to the ends of each shaft are electronically conducting contactor arms 606 and 608 which are shaped such that a contacting element near the end of each will cross and contact each other when both shafts are rotated the same angle from said common zero or starting position. By providing drives 610 and 612 for each shaft, which will step the respective shafts intermittently through similar unit increments, and providing said contactors 606 and 608 as switching elements in a circuit 642 containing a power supply PS, said circuit will be completed to generate a signal utilizable for control purposes, when the contactors touch (i.e. the shafts are at the same angular positions). The crossing of the contactors 606 and 608 signifies that the tape section at or approaching the transducer heads 121' corresponds to that selected by a predetermined rotation of the shaft 602 from its zero position.

The shaft 602 is stepped counterclockwise in FIG. 6 by a mechanism 610 including a ratchet wheel 614 keyed to said shaft driven by a pawl 616 actuated by a solenoid 618. The shaft 602 is rotated counterclockwise and returned to zero by an electric motor 634 coupled directly thereto. The drive 612 for shaft 604 includes means for stepping said shaft in either the clockwise or counterclockwise directions. A ratchet wheel 620 stepped by a pawl 622 actuated by a solenoid 624 steps the shaft 604 clockwise. Ratchet wheel 626 driven by pawl 628 operated by solenoid 630, steps shaft 604 counterclockwise. The input to solenoid 618 is from a rotary dial switch 128 which transmits a selected number of pulses thereto depending on the selected position manually dialed thereby, and steps 602 said selected number of angular units from a starting or zero angular position. Resetting shaft 602 to zero is effected by manually closing switch 632 which pulses the starter of the servo motor 634 driving said shaft clockwise. The shaft 602 rotates until pin 636 projecting therefrom strikes a stop 638. The motor 634 is shut off by a pulse to its stop control from a limit switch 638" actuated when 636 engages 638.

As stated, the position of the shaft 604 at any instant is an indication of the frame of the tape 100 which is adjacent the transducing heads at the same instant. In other words, said shaft 604 moves an angular distance from said zero position, proportional to the number of recording frames moved by the tape from the first frame past said heads. Direction of rotation of shaft 604, clockwise or counterclockwise, is controlled by logical switching means adapted to effect its rotation clockwise in FIG. 6 when tape 100 is being driven in reverse from reel 102 to 101, and counterclockwise when 100 travels in the forward direction from 101 to 102. Said shaft rotation is interlocked to the direction of motion of the tape 100 by use of a bi-stable switch 640 having one signal input from the reproduction transducer 121 which is gated thru 640 to either the solenoid 624 or 630 and a switching input from a circuit 646 to be described. The method of switching 640 may be described by noting the function of a circuit 642 which includes the contactors 606 and 608. The shafts 602 and 604 are electrical conductors and are insulated from each other. Electrical brush contactors 602 and 605 ride on shafts 602 and 604 and provide the contactors 616 and 618 in a series circuit with a power supply PS and a pulse transformer 644. Thus when the contactors 606 and 608 touch each other, the transformer 644 produces simultaneous output signals over the multiple illustrated circuits extending therefrom. An output of 644 extends to the switching inputs of bistable switches 640 and 650. The latter passes a reproduction of the same input to 644 after it has been delayed in delay relay 660 to one of two circuits 652 or 655 and switch 640 is switched thereby to pass the output of frame-pulse reproduction head 121 to one of the two solenoids 624 and 630. An output of 644 is also passed to the switching input of bistable switch 646 which switches an input circuit 647, which is connected to both of the manual control switches 130 and 170, to one of two output circuits 648 and 648' depending on whether the pulse last received by the switching input to 646 from 644 is an odd or even pulse (i.e. a function of the relative position of the contactors 606 and 608 prior to closing said circuit which in turn is a function of the relative position of the tape and transducing heads).

The circuit 129 is essentially a positional computer and controller of the motion of the tape, and the condition of the bistable switches 640, 646 and 650 is an indication of whether the selected frame of tape from or to which transducing is required, is on reel 101 or 102. The condition of switch 646 for example, determines whether the tape will be driven forward or in reverse when the controls 130 or 170 are energized. An example will first be given describing the control action occurring to effect tape motion, camera and transducer gating to transduce on and/or from a selected frame when said frame is located on reel 102 ahead of the transducers.

For this situation, it will be necessary to automatically drive the tape in reverse a distance such that, when stopped by the action of said controller 129 and 131, said tape will be in a position for transducing on or from the selected frame by the operation thereafter of the single frame transducing controller 163. When the selected frame is ahead of the heads 121', switch 646 is conditioned such that its signal input 647 from manually operated switches 130 and 170 is connected through circuit 648 to the reverse drive inputs R of the tape transport mechanism. Thus, if said selected frame is ahead of said transducing heads somewhere on reel 102, actuation of either switch 170 or 130 will cause the tape transport to drive the tape in reverse so that the selected frame will approach said heads. When the selected frame is on reel 102, switch 640 is in the switching condition 640a whereby the output of 121 will energize 634 and step shaft 604 clockwise to cause 606 to approach 608. Bistable switch 650 is in a condition 650b such than when 644 is next energized as the contactors of arms 606 and 608 cross, it, 650, will switch to its other condition 650a so that an output from 644 will be passed therethrough over a circuit 652. A reproduction of the same pulse which caused an output from 644 and switched 650 to 650a as 606 and 608 crossed, is passed through 650 after the latter has switched to 650a by the provision of delay relay 660 in the output circuit 651 of 644 and is used to energize control apparatus to effect stoppage of the tape with the selected frame a predetermined distance behind the heads 121', on reel 101, so that energization thereafter of the single frame or cartooning selector switch 162 and the sequential controller 163 will result in transducing from and/or to said selected frame. Said apparatus for automatically effecting stoppage of the selected frame of said tape a predetermined distance or number of frames beyond or behind said heads comprises a predetermining counter 654 and a normally open switch 653 having a switching input from 650, a signal input from the reproduction transducer 121 and a signal output from 121 extending to counter 654. The counter 654 is a self-resetting predetermining counter-relay adapted, upon the receipt of a predetermined number of frame indicating pulses from 121 transmitted thereto after the selected frame has crossed the transducing heads after 606 and 608 have crossed, to transmit an energizing signal to the tape transport motor stop inputs or stop control S. The count setting of 654 is similar to that in the predetermining counter of the single frame controller 163 and is of a sufficient counter magnitude to stop the selected frame a sufficient distance behind the transducing heads to permit said tape to accelerate to the required video recording speed and to attain a constant recording velocity prior to the arrival of said selected frame at said transducing heads when selector 162 is energized. The normally open switch 653 is provided with a built-in delayed opening circuit or dashpot mechanism adapted to automatically open said switch a delayed period after closing sufficient to permit the counter 654 to receive its predetermined pulse count from 121 to that subsequent reproduction from the tape will not affect 654. The notion 662 refers to a normally closed switch which is opened when the panel switch 664 is closed during the operation of the dial selector 128 to prevent the energizing of 653 should the contactors of 606 and 608 cross during the setting up of the frame selection computer 121. When switch 664 is closed, it simultaneously opens normally closed switch 162a preventing the passage of any signal to 131.

In the situation where the selected frame is a sufficient number of frames behind the transducing heads on reel 101 to permit acceleration of the tape to the required constant video recording speed by the time said selected frame passes said transducing heads, 608 is counterclockwise of 646, 640 has been conditioned from the prior pulse from 644 to switch to condition 640b so that the output of 121 is passed to 630 and used to step 606 counterclockwise toward 608; 650 is in condition 650-b so that the output of 644 will be passed to 131 and 132 over circuit 655. The switch 646 is in a condition 132 whereby the starting pulse from circuit 647 will be passed over circuit 648' to the forward drive control F of the tape transport. When contactors 606 and 608 cross, as the beginning of the selected frame approaches the transducing heads and the marker pulse for the selected frame is near the reproduction head 121, the pulse transformer 644 becomes energized and transmits pulses to said various switches including said selection transducing pulse through switch 650 to 131 and 132 to effect the described action or actions depending on whether one or both the switches 130 and 170 were initially energized.

Figure 7:
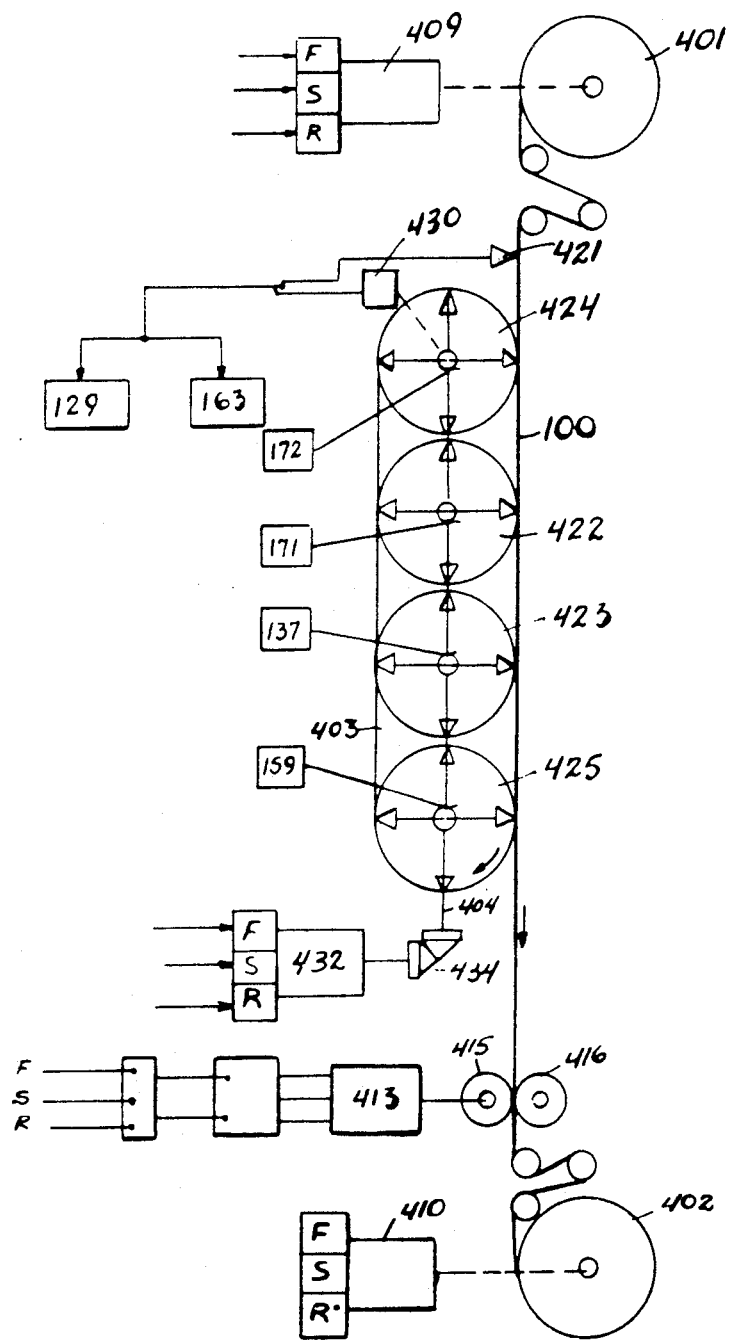
FIG. 7 is a schematic diagram which is applicable to FIGS. 4a and 4b and illustrates a rotating magnetic recording and reproduction head arrangement for recording transversely across an elongated magnetic tape.

FIG. 7 is a schematic diagram showing details of video recording and reproducing apparatus similar to that illustrated in FIGS. 4a and 4b and applicable with minor modifications to the control means thereof, which utilizes transducing apparatus comprising means for moving both a magnetic tape and the transducing heads, the latter movement being lateral to or across said tape when transducing thereon or therefrom. Reference is made to the Ampex Video Tape recorder, described in the August, 1956 issue of Electronic Industries for details of such type of magnetic recording apparatus which comprises in part a rotatable drum 403, on which arrays of magnetic transducers are provided which rotate therewith and terminate at or near the surface of said drum 403 over which the tape 400 is driven in a path essentially parallel to the axis of rotation of said drum so that said transducers sweep paths which are parallel to each other and oblique to the edges of said tape.

Operation is accomplished by utilizing a relatively wide tape for 400 and providing means for holding said tape against the surface of the drum so that the width of said tape covers 90 to 120 degrees of rotation of the drum. By mounting three or four common recording and/or reproducing transducer heads at 90 or 120 degrees apart on the drum in the same plane normal to the axis of rotation, so that each sweeps the same circular path, and connecting all heads to a common input or output circuit by means of commutators and brushes operatively connected to said drum, the end of a signal recorded by one head on an oblique band area of the tape 400 will be continued at or near the beginning of the next parallel recording area swept by the next head, in said group, to sweep across said moving tape. With this type of apparatus, the tape may be driven at a much slower speed than that of FIG. 4 as the rotation of the transducers mounted on the drum contributes to the relative recording speed.

In FIG. 7 five transducing head groups are shown for the purposes of illustrating the transducing functions and include a group 421 for reproducing the so-called frame marker pulse; 422 for recording said frame marker pulses; 424 for recording said video signal; 425 for reproducing said video signal and 423 for erasing any signal thereopposite when energized or powered. Said five groups may be replaced by one or two groups of heads, if said heads are each adapted to perform the multiple functions of record, reproduce and erase signals depending on which of said transducing means is energized.

A single group of heads adapted to perform all three transducing functions will suffice if a limit switch 430 actuated by a protrusion or cam section of the shaft 404 on the drum 403 each time said drum rotates, is utilized to indicate frame position. The limit switch 430 is adapted to transmit a pulse each time a specific multiple head in the rotary group approaches during its rotation, the border of the tape 400. The pulse is transmitted to either or both the controller 129 and 163 in accordance with FIGS. 4a and 4b whereby said switch 430 replaces said marker pulse reproduction head 121 and eliminates the necessity of recording frame marker pulses through 123. When utilizing 430, each separately recorded video signal will be recorded at or near the beginning of an oblique recording area near the edge of the tape or a predetermined distance from said edge and each will extend along the same number of said oblique areas. Thus frame selection will be a matter of presetting the positional computer 129 to transmit a control pulse over its output upon the receipt at its input of the number of pulses from 430 indicative of the specific longitudinal motion of the tape 400 to reach the selected frame.

The rest of the control circuitry is assumed to be similar to that illustrated in FIGS. 4a and 4b. The motor and controls 409, 410 and 413, correspond to motor driving means similar to respective drives 209, 210, and 213 of FIGS. 4a and 4b, which are modified to effect the necessary constant speed operation. A constant speed motor 432 is provided, and is controlled to start and stop by the controls F and S illustrated in FIGS. 4a and 4b, to drive the shaft 404 of drum 403 through gears 434 one of which is secured to the shaft 433 of 432. The tape 400 is started and stopped, reversed and automatically controlled as in FIGS. 4a and 4b.

Figure 8:
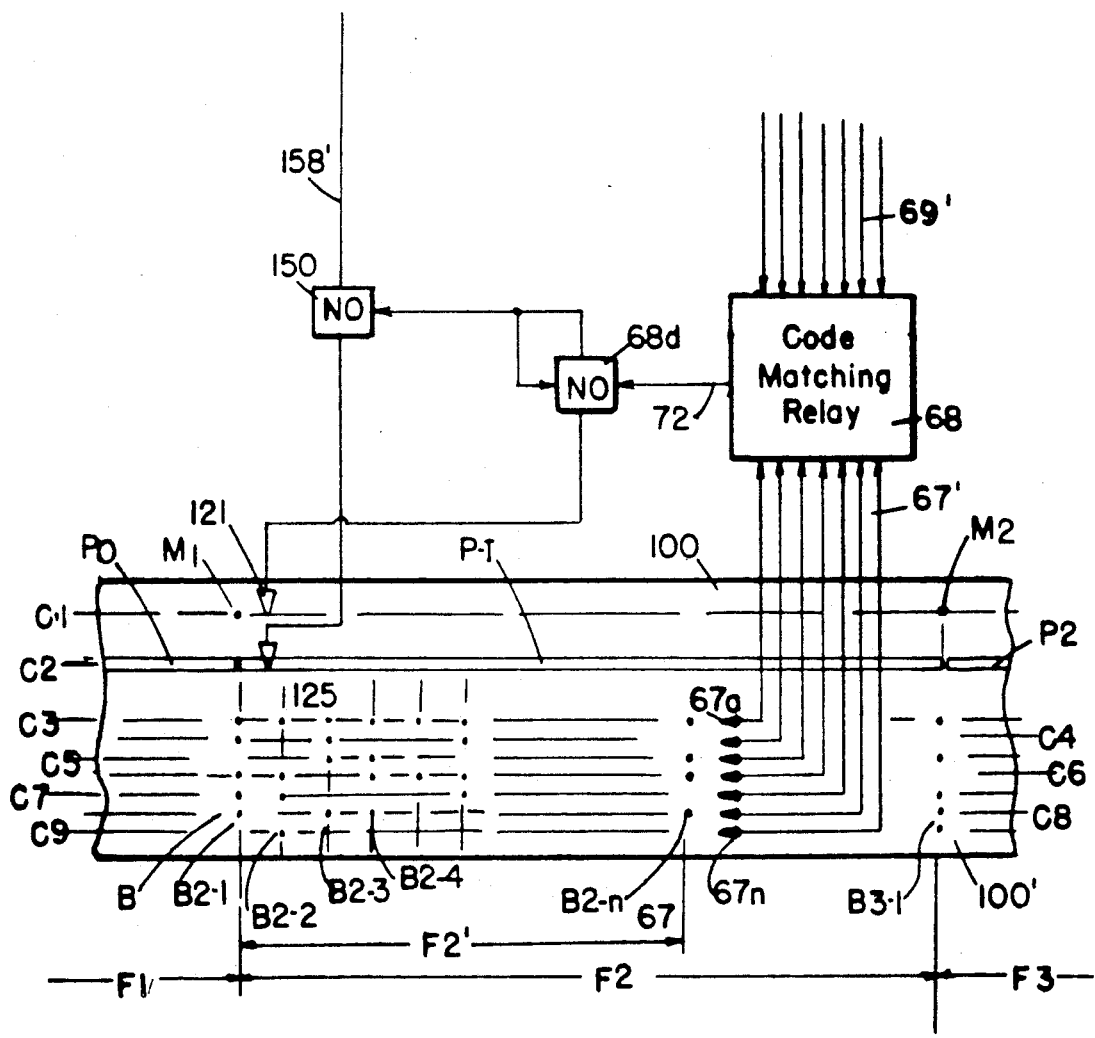
FIG. 8 illustrates a portion of a card or recording tape and means for reproducing code signals therefrom and employing the code signals to effect the selective reproduction of information from the tape.

FIG. 8 shows a recording arrangement in the realm of this invention in which a recording area 100' is provided on the magnetic recording member 100 on which may be recorded a plurality of frame identifying codes with sufficient longitudinal recording area provided for recording a plurality of said codes which are related to a particular recorded video picture signal. In other words, there is sufficient recording area for recording a number of codes for each recorded picture signal so that cross referencing may be effected or different codes may be provided each relating to different subject matter contained in the same picture signal, each of which codes may be operative to effect the reproduction of the same picture signal.

Recorded on the first channel C1 of recording member 100 are marker signals M1, M2 ... Mn for positionally indicating the leading edge or start of each picture signal. The plural picture signals P1, P2 ... Pn are shown recorded in tandem array and occupying respective frame lengths or portions of the recording member 100 referred to by the notations F1, F2 ... Fn. The picture signals may also be recorded oblique to the longitudinal axis of the recording member 100 by apparatus such as provided in FIGS. 2 and 7.

Parallel bit codes B are shown recorded on the parallel code tracks C3, C4 ... Cn and are reproducible by magnetic reproduction heads PU3 ... PUn. These code reproduction heads are so spaced in the relation to the picture signal reproduction head 125 that the last parallel code BN-n in the series provided for each frame will be reproduced before reproduction of the associated picture signal so that any of the codes may be used to effect gating of its associated picture signal to a monitor recorder or storage tube, regardless of the position of the code.

Figure 9:
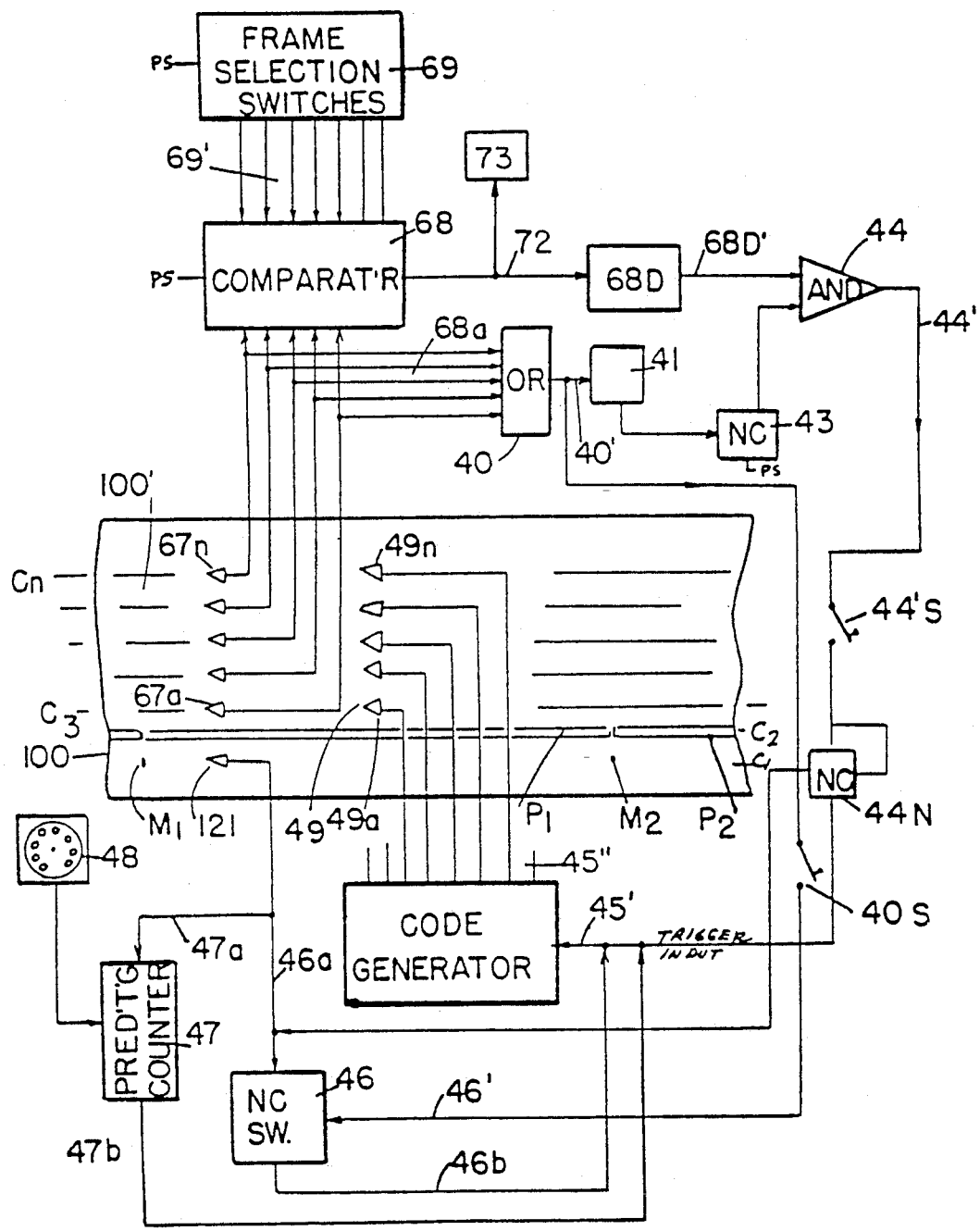
FIG. 9 is a plan view of another section of a card or recording tape of the type employed in FIGS. 4a and 4b and also illustrates apparatus for recording codes in parallel arrays longitudinally along the tape and for reproducing such codes to effect the selective reproduction of information from the tape.

FIG. 9 illustrates means for automatically effecting the recording of frame identifying codes as well as cross-reference codes on the code recording channels or border area 100' of an erasable recording member such as the hereinabove described magnetic recording tape, or other suitable recording member such as a magnetic recording disc or drum, thermoplastic (TPR) recording member or other suitable recording member capable of having transduced thereon visible or sensitized spot or pulse recordings.

The apparatus provided in FIG. 9 may be operated to permit three types of recording functions, namely (a) recording of parallel codes such as binary codes for identifying each frame such as the codes B2-1, B3-1, etc. shown in FIG. 8 as both identifying the frames associated with each as well as indicating the starting location of each frame. These so called frame codes are recorded in consecutive order; (b) recording a cross-reference code associated with a particular frame on the next recording-free lateral area of the code recording area pertaining to or associated with said frame; (c) recording a particular frame code relative to a predetermined picture signal recording or predetermined length of the recording member, the location of which is known to the operator of the apparatus.

Considering the recording functions in the order presented above, a bank 67 of code sensing relays or transducers, 67a to 67n, is positioned with respective transducers adapted to read or sense code recordings on respective of the recording channels C3 to Cn which extend longitudinally along the code recording area 100' of the recording member 100. These transducers may comprise photo-multiplier tubes with respective optical scanning means if the member 100 comprises recording films such as thermoplastic, TPR, recording material or Kalvar recording film, or said transducers may be conventional magnetic reproduction heads provided as a bank with each adapted to transduce from a respective of the channels C3 to Cn. The pick-ups of bank 67 are each connected to a respective input to a code matching relay 68, the other inputs 69' of which are energized in the desired coding array by means of a plurality of open and closed switches provided in the switching bank 69 as described. When the code appearing at the pickups 67 matches the code generated on the inputs 69', the code matching relay 68 will generate a signal on its output line 72, as hereinabove described which may be used to effect code recording control or to initiate an action resulting in said control. This signal is passed to energize a time delay relay 68D or limited TIME function which generates a signal on its output 68D' for a time interval approximately equal to either that during which the entire associated video picture signal will pass its reproduction or scanning transducer or that in which that length of the recording area 100' allocated to receive code signals associated with a particular frame will pass a given point. The output of 68D is passed to one input of a logical AND switching circuit 44 having a second input from a normally closed switch 43 or NOT circuit.

The output 44' of AND circuit extends to a code generator 45, which, when 44' is energized, generates a parallel binary code on various recording circuits for recording onto channels C3 to Cn.

The functions of the circuits or control elements disposed between the comparator device 68 and the AND circuit 44, which generates an output when both its inputs are energized, will best be described by analyzing the condition to be met when it is desired to energize or trigger the code generator 45. Each frame F of the recording member 100 may have recorded on its code area 100' a single code such as B2-1 of FIG. 8, which identifies the associated picture signal and is preferably the first code reproduced with said picture signal. The code recording area 100' of each frame may also have recorded thereon any number of additional codes such as B2-2, B2-3, B2-4, etc. depending on how many cross reference codes or the like have been previously recorded. These codes may extend as individual pulses recorded longitudinally along the various channels as discrete bit recordings or areas void of bit recordings. Since in this recording function it is desired to record the new cross reference code at the end of the last code recorded laterally along the first lateral code recording length of 100' which does not already contain a code, the presence of all previous recorded codes may be used to affect control of the new code recording.

The parallel outputs 67' of the code pick-ups 67a to 67n are also connected to a logical OR circuit 40, the output 40' of which will be energized whenever any one of its inputs 68a, which extend from the outputs 67' of code reproduction head bank 67, is energized. Thus, as long as codes are scanned by the transducers of 67, OR circuit 40 will generate pulses on its output. The output 40' of 40 extends to the switching input of a limited TIME function 41 which may be an electron tube or solid state switching circuit adapted to generate an output signal when its input 40' is energized for the time interval between reproduction of successive parallel codes so that as long as codes are being reproduced following the reproduction of the initial code, the output 42 of 41 which may be a power gating normally open, slow-to-open after closing switch, will have a signal generated thereon. The signal generated on line 42 may be used to retain a normally closed switch 43 open by energizing the latter's input which prevents a signal from a power supply PS passing to the second switching point input of AND circuit 44.

When the code pick-ups of bank 67 have scanned the last code provided on the selected frame, circuit 40' is deenergized, 41 fails to generate an output signal or opens and normally closed switch 43 closes energizing the output 43' thereof. Since 68D is generating a signal for at least the time interval necessary for the entire code recording portion of 100' to pass the code recording heads 49, AND circuit 44 become activated and a signal is generated on its output 44' which is transmitted to the input 45' of a code generator 45 a code generating device 45 having respective outputs connected to the recording transducer 40a to 40n which is automatically operative to record a predetermined code on the recording free area of 100'.

The latter device 45 may comprise a plurality of bi-stable switches which are activated in the desired code array by manual actuation, punched card or other means which connect a power supply with respective normally open switches which are simultaneously pulsed to close by the signal from 68D generated on line 45' for effecting recording of short pulses or code marks by pulsing those output of lines 45" of 45 for a short duration. A normally closed switch 44N is provided in the output line 44' of 44 which is operative upon the receipt of the signal from 68D passed through 44 to remain closed for only a short time duration and to open thereafter and remain open until a switching input thereto is energized by the next pulse generated by pick-up head 121 in scanning the next marker pulse such as M2. Notation 44'S refers to a manually operative switch in the output line 44' of 44 which may be opened by the operator of the apparatus when it is desired to effect other types of code recording which will be described.

If it is desired to record any binary code to identify a picture signal following that which is the last picture signal in a tandem array of said signals having a frame identifying parallel code recorded on the area 100', switch 44'S is opened and a second switch 42S is closed whereby the output of the OR circuit 42 is passed to the switching input of a normally closed switch 46 having a signal input 46a from the described marker pick-up head 121. Thus no signals will pass through switch 46 until no signals appear on the switching input 46' thereto which is indicative that no code signals are being reproduced by the bank 67 of reproduction transducers. Switch 46 which is slow to close after opening a degree such that as long as frame indicating signals appear at the pick-up transducers 67, the switch 46 will remain open. When said switch 46 closes the frame indicating pulse or mark for the next frame thereafter generates when scanned by 121 a signal on line 46a which passes through 46 to the input 45' of the code generating device 45 so that the code recorded or pre-set therein is next read or generated on the output lines 45" and recorded through the recording transducers 40a to 40n. It is of course assumed that the bank of transducers 40 is immediately adjacent the pick-up transducers 67 or comprises the same transducers as 67 with the connections 45" made to effect, when energized, pulse recordings.

If it is desired to effect the recording of a parallel code programmed or pre-set in the code generating device 45 along any predetermined lateral area of the code recording area 100' of 100, a predetermining counter 47 is provided which may be pre-set by manual or other means such as a rotary dial switch 48 generating a predetermined number of pulses on the pre-setting input 48' to 47. Feedback signals are generated by marker pickup head 121 and transmitted to the feedback input 47a to 47. When the feedback signals are equal in number to the signals generated by 48 and used to preset 47, a pulse is generated on the output 47b of 47 which is transmitted to the input 45' to code generator 45 which effects readout of the code programmed therein on the output lines 45" feeding the recording heads 40.

By means of the apparatus illustrated in FIG. 9, parallel codes extending laterally across the recording member may be generated on the next free or unrecorded lateral space of a particular frame, in a tandem order or on any predetermined or selected frame or lateral recording area of the tape.

The parallel outputs of code pick-up heads PU-3 to PU-n are passed to code a matching relay 68, as described, having parallel inputs 67' from a code generating selection means such as selection switches 69 of FIG. 2. If one or more of the reproduced recorded parallel bit codes associated with a particular frame are operative to energize the code matching relay 68, a relay 68D is provided in the output 72 of 68 which is operative to pass the next marker signal reproduced by pick-up 121 to energize normally open switch 150 to close and pass the associated composite video picture signal on the output 158' to the monitor recorder or storage tube. The relay 68D may comprise the combination of a bi-stable switch. The input to the 68D from comparator relay 68, when energized, is operative to close a switch in the output of marker signal pick-up 121 and the switching input to video picture signal gate 150. The bi-stable switch in 68D is opened when the marker signal passed therethrough, is passed to the other switching input of said 68D as well as to 150. Thus matching of any code on recording area 100' will effect reproduction and gating of the associated picture signal through output control gate 150.

The apparatus illustrated in FIG. 9 may have certain modifications made thereto to provide either the same mode of operation or variations therein. For example, it is noted that the code matching relay 68 utilized in FIG. 9 for effecting the recording of a further code, such as a cross reference code, relative to a predetermined frame of video information, may also be utilized to effect the hereinabove described functions of selectively reproducing a particular frame or frames of video information. The output 72 of comparator 68 may also be connected as illustrated in FIG. 2 for effecting either the selective recording of a video picture signal along a predetermined segment of the recording member 100 or the selective reproduction of a predetermined picture signal therefrom. Thus a single code matching relay such as 68 may be used to perform one or more of the plural functions of recording or reproducing picture signals or frame identifying codes depending on which of the illustrated control switches are activated.

The code matching relay 68 may be replaced by a presettable predetermining counting means such as 47 receiving feedback signals such as those reproduced in scanning marker signals M as well as a plurality of closely spaced marker signals between said frame marker signals. However, the code matching relay is not applicable where random cross referencing is desired.

It is also noted that if the recording member 100 is of the electro-optical type such as thermoplastic (TPR) or Kalvar recording material, the code pick-up means 67a to 67n may comprise a bank of photomultiplier tubes having optical means for identifying ripple codes which may be generated either by a scanning, recording electron beam or a plurality of electron beams replacing respective of the recording transducers 40a to 40n. Said recording transducers are preferably closely spaced behind the reproduction transducers 67 which, if the member 100 is a magnetic recording member, may comprise the same transducing heads for both the recording and reproduction of said code signals with the particular mode of operation depending on the manner in which the individual transducing heads are energized.

If a single electron beam is utilized to generate the parallel codes by sweeping across the code recording area 100' of member 100, the code may be provided as an analog signal for intensity modulating the beam and may be held in storage in a storage device such as a recording member which is activated to generate said analog signal when the output 44' of an AND circuit 44 becomes activated. For thermoplastic recording the transducers 40a to 40n may comprise a plurality of electrodes in the form of wires disposed closely adjacent member 100 over the tracks C3 to Cn which transducers are simultaneously pulsed or energized when the code generator means 45 becomes activated to provide pulse charges across the recording member in the desired coding array. Similarly, if a plurality of electron beams are provided with at least one beam scanning each of the coding tracks C3 to Cn, they may be held inactive or at a low intensity level until the code generator means 45 becomes activated where upon parallel pulse signals are generated on the intensity modulating inputs of each of same beams to generate said parallel code across 100. The plurality of code generating electron beams may also be deflection controlled to simultaneously move along parallel paths to seek code recording areas if the recording member 100 is held stationary in an information storage system in which the recording and reproduction is effected by respectively reflection controlling writing and reading electron beams. In this respect it is also proposed that a recording and reproduction system be provided utilizing an erasable recording material such as thermoplastic (TPR) recording material in which a single electron beam is utilized for both selectively recording information on a thermoplastic recording member and reproducing selected information therefrom. During the recording functions the beam is generated at a high enough intensity to effect the generation of charge patterns in the storage layer of the recording member. During the reproduction function the beam is generated in such a manner as to provide a feedback signal for reading selected areas of the recording member.

If recording member 100 is optically scannable such as photographic film, TPR or heat developable film, pick-ups 67 may comprise a bank of photomultiplier tubes adapted to scan respective tracks or channels of the recording code areas.

A latitude of modification and substitution is intended in the foregoing disclosure, and in certain instances some features of the invention will be used without a corresponding use of other features. Accordingly it is appropriate that the appended claims be construed broadly and in a manner consistent with the spirit and scope of the invention.

Other forms of the instant invention are noted as follows:

I. Instead of document recordings defined by full-frame picture signals generated by the television camera scanning of hard copy or documents, recordings of equal time duration may be recorded along the magnetic tapes described, which recordings are analog or video representations of pages of lines of characters or code representations generated originally by a digital computer in a manner provided in my patent application Ser. No. 538,916 filed Jan. 6, 1975 and entitled Method of Recording and Monitoring Computer Output Information.

II. Digital information in the form of pulses arrayed into binary codes and presented or generated in the form of frames thereof or blocks of information may be similarly recorded and defined by frame indicating codes of the type described, along the described frame recording areas of the magnetic tapes described. Such information may comprise the information generated on the output of a digital computer or other device such as an image field digitizer or digital television camera. The digital information generated by a digital computer as binary digital pulse codes may be divided into blocks or frames by a timing means which is operable to generate timing pulse signals which are the equivalent of the described clipped frame vertical sync signals and are generated at time intervals similar to the intervals in which the frame vertical sync signals are generated and used in the manner in which the described clipped vertical sync signals are used to effect frame recordings along the frame recording areas of the tapes described. For example, if a frame or block of digital information is recorded on a circular track of a magnetic disc or drum or is held in core or matrix storage until required to be read out when the selected frame of the tape is in scanning relation with the recording head therefore, such readout may be effected by the timing signal equivalent of the described frame video vertical sync signal.

Modifications to the apparatus for recording on and reproducing video information from record tape, discs or cards may be made as follows without departing from the instant invention:

I. Each of the magnetic reproduction transducers described may be replaced by a photo-optical transducer such as a photo-transistor operable to sense the magnetic recordings or radiation recorded video information of the type described and to generate video signals for use as described when so energized. If the record member is a transparent sheet or card containing parallel tracks of optically scannable recorded information arranged and composed as described (e.g. full frame composite video picture signal recordings each occupying a track of the card or tape and scannable with reflected or transmitted light) then a single light source may be disposed beneath the record member to provide light passing through each of the record tracks of the record member to respective of the photo-transistors of the bank which are selectively energized as described.

II. The magnetic reproduction transducer may be replaced by respective arrays of photo-optical transducers and respective light sources for illuminating respective record tracks of the record member and providing reflected light to their respective transducers which is modulated by the information recorded along the record tracks scanned by the respective transducers. Respective pairs of closely spaced photo-diodes for generating fine light beams and phototransistors for receiving light from their associated photodiodes after it has reflected off the selected tracks of the cards may be employed which combinations are selectively energized as described to permit the photo-optical scanning of selected tracks of the cards fed to the reading apparatus.

III. Where a single transducer is employed as in the embodiments of FIGS. 8 and 9, it may be replaced by a small light source associated therewith and operable to scan the oblique tracks of the record member. The light source may be gated on and off when aligned with a selected oblique track of the card containing selected recorded information such as a selected full frame video picture signal recording.

IV. A single photo-optical transducer may be utilized to reproduce information from a selected track of parallel tracks extending longitudinally along a record tape or card. Such a transducing arrangement may comprise a single light source and a single photoelectric detector for light passed through or reflected off a selected of the parallel tracks of the record member and emanating from said single light source. The light source may comprise a laser generating a narrow beam of light or other source of light of sufficient intensity which light beam is deflection controlled to cause it to intersect the selected track of the card containing the information to be scanned and is passed through the record member or is reflected to a photoelectric detector disposed adjacent the record member. Deflection of the beam may be effected by conventional laser beam deflection means such as by passing same to a mirror or a prism or lens which is electro-mechanically pivoted by a controlled servo such as a controlled electric motor, electro-magnet or other means to reflect or diffract the beam from the light source and cause it to intersect the selected track of the tape or card as it is driven through the reader. The photo-electric detector may comprise a single photoelectric cell extending completely across the card or so located within the reader as to pick up light reflected from any of the tracks of a card scanned by light from said light source and to generate signals on its output representative of the information recorded on the track scanned.

If the record member is light transmitting and the recordings are operable to modulate light with their information as the light is passed through the card, then photoelectric detection means may be disposed completely across and beneath the card to receive the light passed through any track of the card.

VI. In yet another form of the instant invention, a single source of recording radiation, such as a laser, may be disposed in a housing and operable to be deflected or otherwise controlled to align its beam with a selected track of the record member and either the beam is moved along the selected track by controlled deflection thereof or record member is moved past the beam while the beam is intensity and/or deflection modulated to effect variable recording of the video information along the selected card track. Recording of such information may be effected by selectively and variably eroding portions of a thin film of plastic or metal disposed along the selected track of the card with the intensity modulated and/or deflection controlled beam or by selectively sensitizing a photographic emulsion provided along the scanned record track.

VII. Control of the reading and/or writing beams described above to bring them into lateral alignment with a selected track of the record member is effected by causing the same beam generated at a low intensity or an auxiliary beam to scan laterally across the card prepositioned with respect to the beam generating means and causing same to scan indicia aligned with each record track of the record member to generate pulses or codes as electrical signals which are employed as feedback signal for a preset counter or code matching means of the type described which is operable to control beam deflection by stopping the beam when located on the selected track or by gating a suitable deflection control signal to the beam deflection means when the selected track has been detected as indicated by the signals generated in scanning said track locating indicia. Thereafter, the beam scans the selected track which it is aligned with or the card is driven to cause the beam to scan the selected track. Record member movement during recording may be initiated by a signal generated by the aforementioned counter or code matching relay or may be an uninterrupted extension of record member movement through the reader if the scanning beam deflection to the selected track is rapid enough to permit the beam to be controllably aligned with the selected track of the record member before the leading end of the video signal recording on the selected track comes into alignment with the beam, or before the forward portion of the selected track on which signal recording is desired comes into alignment with the beam.

Thus by substituting lasers or electron guns for the transducers employed to record spot-like recordings defining codes, characters or video information and controlling same to be pulsed with control signals generated as described, such beam generated pulse recordings may be provided along the record member in the form of codes, dot matrix characters, video picture information or the like. Similar spot recordings may be provided along plural tracks of the record member by a single laser or electron beam which is properly deflection controlled as the record member is moved therepast or which is deflection controlled to scan along two axes to generated lines of codes, characters or video information on a selected portion or portions of the record member by selectively burning, discoloring, eroding or vaporizing the record member or a coating thereon.

I claim:

1. A method for recording information in a record member and transducing selective portions of said information to form monitorable still images, said method comprising the steps of generating a first group of information signals, recording said first group of information signals on a first portion of said record member, generating and predeterminately recording a first code on said record member for locating and identifying the recording of said first group of information signals, repeating the preceding steps to generate and record a plurality of additional groups of information signals and respective codes, each of which code identifies and defines the location of a respective one of said additional groups of information signals, and when it is desired to monitor the information contained in a selected one of said recorded groups of information signals, selectively reproducing an address signal representative of the first code which identifies and locates the selected group of information signals, and employing said first code to effect the selective reproduction of said information signals from said record member and the application of said information signals to a display means operable for generating images, and generating an image derived from said selectively reproduced information signals on said display means and wherein a plurality of different characteristic codes are recorded, each of which defines a characteristic of the information contained in one of said recorded groups of information signals, and wherein each of the plurality of different characteristic codes differs from the others and is related to a different characteristic other than location of the group of information signals defined thereby.

2. The method in accordance with claim 1 wherein the step of generating the first and additional groups of information signals includes generating the groups in the form of television video signals, and wherein the step of recording the first and additional groups of information signals includes recording the groups in the form of television video signals.

3. The method in accordance with claim 1 wherein the step of recording the first and additional groups of information signals includes recording the groups on said record member in the form of signals defining video information.

4. The method in accordance with claim 1 wherein the step of generating said first and additional groups of information signals includes deriving them from video signals defining full frames of video information.

5. The method in accordance with claim 4 further comprising the step of generating the video signals on an output of an electronic camera.

6. The method in accordance with claim 4 further comprising the step of generating the video signals on an output of an electronic storage device.

7. The method in accordance with claim 1 wherein the step of recording the first and additional groups of information signals in said record member includes recording said groups in the form of analog signals defining video information.

8. The method in accordance with claim 1 wherein the step of generating said first and additional groups of information signals includes deriving said groups from analog signals defining full frames of video information.

9. The method in accordance with claim 8 wherein the step of deriving the groups of information signals from the analog video signals includes receiving the analog video signals from an output of an electronic camera.

10. The method in accordance with claim 1 further comprising the step of storing, in a display buffer, display signals derived from said selectively reproduced information signals, and wherein the step of generating an image includes the step of repeatedly reading said display signals from said display buffer and applying said display signals to generate and maintain said image on a short persistence display screen.

11. The method in accordance with claim 1 wherein the step of recording the first and additional codes on said record member includes recording the codes in digital form.

12. The method in accordance with claim 1 wherein the step of recording the plurality of additional characteristic codes on said record member includes recording the characteristic codes in digital form.

13. The method in accordance with claim 1 wherein the steps of recording said first and additional codes and said information signals on said record member include storing the codes and information signals on a magnetic disc.

14. The method in accordance with claim 1 wherein the steps of recording said first and additional codes and said information signals on said record member include storing the codes and information signals on a record member which is coated with magnetic recording material.

15. The method in accordance with claim 1 wherein the steps of recording said first and additional codes and said information signals on said record member include storing said codes and information signals on a record member comprised of electro-optical recording material.

16. The method in accordance with claim 1 wherein the steps of recording said first and additional codes and said information signals on said record member include storing said codes and information signals on a record member comprised of magnetic tape.

17. The method in accordance with claim 1 wherein the steps of recording said first and additional codes and said information signals on said record member include recording said codes and information signals in a magnetic recording layer of the record member.

18. The method in accordance with claim 1 wherein the steps of recording said first and additional codes and said information signals on said record member include controlling a laser to record the codes and information signals on an optically scannable record member.

19. The method in accordance with claim 1 wherein the steps of recording said first and additional codes and said information signals on said record member include controlling an electron beam to selectively heat recording regions of a thermoplastic recording material.

20. The method in accordance with claim 1 wherein the step of applying said information signals to a display means includes generating synchronizing signals to control a display screen of a video monitor.

21. The method in accordance with claim 1 wherein the step of applying said information signals to a display means includes generating analog signals to control a beam to create an image on a display screen of a television receiver.

22. The method in accordance with claim 1 wherein the step of applying said information signals to a display means includes generating analog signals to control a beam to create an image on a display screen of a cathode ray tube.

23. A method of addressing information stored on a record member comprising the steps of: recording first codes on code-recording portions of a record member, recording discrete groups of information signals adjacent said code-recording portions of said record member, effecting relative movement between said record member and a transducing device which records and reads codes, generating feedback signals by reading said first codes recorded on said code-recording portions of said record member, comparing said feedback signals with a select address code, generating a control signal when the feedback signals match said select address code, and using said control signal to generate and record a further code on a selected area of said record member.

24. The method in accordance with claim 23 wherein said further code recorded on said selected area of said record member indicates that a match occurred between the select address code and the feedback signal.

25. The method in accordance with claim 23 further comprising the step of recording the first codes in digital form.

26. The method in accordance with claim 23 further comprising the step of generating said select address code by selectively operating at least one of a plurality of switches.

27. The method in accordance with claim 26 wherein the switches are manually operated.

28. The method in accordance with claim 23 wherein said select address code is generated by manually operating selected keys of a keyboard.

29. The method in accordance with claim 23 further comprising reading said first codes recorded on the code-recording portion of the record member in a sequential manner.

30. The method in accordance with claim 23 further comprising the step of using said control signal to effect the reproduction of a select discrete group of information signals from said record member.

31. The method in accordance with claim 23 further comprising recording said discrete groups of information signals in said record member in the form of signals defining video information.

32. The method in accordance with claim 31 further comprising reproducing said select information from said record member in the form of signals defining video information.

33. The method in accordance with claim 32 further comprising the step of storing said reproduced signals defining video information in video memory means for use in effecting the generation of full frame video display signals.

34. The method in accordance with claim 33 further comprising the step of applying the full frame video display signals to generate an image on a short persistence video display screen.

35. The method in accordance with claim 32 wherein said signals defining video information are derived from video signals representing full frames of video data.

36. An apparatus for storing, reproducing and displaying information comprising:
first means for storing a plurality of discrete groups of signals defining frames of visual information,
second means for reproducing from said first means select ones of said discrete groups of signals and for generating electrical signals representative of the frame of visual information defined by said reproduced group,
third means including a display having a viewing screen with a short persistence image generating means requiring restorative information signal scanning at a fixed rate to maintain an image on said viewing screen to permit said image to be visually monitored by a person viewing said screen,
fourth means connected to said display for receiving and storing said electrical signals generated by said second means,
fifth means for reproducing said electrical signals stored by said fourth means at a fixed frequency equal to the restorative information signal scanning rate required to maintain an image on said viewing screen of said display,
sixth means for applying said electrical signals reproduced from said fifth means to said display to effect the generation and retention of images on its viewing screen for a sufficient period of time to permit a person viewing said screen to visually monitor the information defined by the discrete group selectively reproduced from said first means, and
seventh means for controlling the operation of said fifth means to cause it to erase electrical signals recorded in said fourth means permitting new discrete groups of signals defining at least one frame of visual information to be selectively reproduced from said first means by said second means and applied to said fourth means and to be reproduced therefrom and employed to effect the generation of respective images on said display screen.

37. The apparatus in accordance with claim 36 wherein the discrete groups of signals stored in the first means comprise analog video signals.

38. The apparatus in accordance with claim 36 wherein the discrete groups of signals stored in the first means comprise signals derived from the output of an electronic camera.

39. The apparatus in accordance with claim 36 wherein the discrete groups of signals stored in the first means comprise analog signals derived from the output of an electronic camera.

40. The apparatus in accordance with claim 36 wherein the discrete groups of signals stored in the first means comprise signals derived from the output of an electronic storage device.

41. The apparatus in accordance with claim 36 wherein the discrete groups of signals stored in the first means comprise signals derived from the output of an electronic recording and reproduction unit.

42. The apparatus in accordance with claim 36 wherein the first means comprises a magnetic tape recording and reproduction unit.

43. The apparatus in accordance with claim 36 wherein the first means comprises a magnetic disk.

44. The apparatus in accordance with claim 36 wherein the first means includes an electro-optical storage device.

45. The apparatus in accordance with claim 36 wherein said second means includes a plurality of manual switches and control means controlled by the selective manual operation of said switches for transducing select ones of said discrete groups of signals to electrical signals defining frames of visual information.

46. The apparatus in accordance with claim 36 wherein said first means includes:
a record member;
means for recording first codes on code-recording portions of said record member;
means for recording each of said discrete groups of signals on a respective information-recording portion of said record member, each one of said information-recording portions being associated with a corresponding one of said code-recording portions;
means for reading said first codes recorded on said code-recording portion of said record member and generating corresponding location-indicating signals representative of the location of said first code in said record member; and
means for reading the discrete groups of signals recorded on said information-recording portions of said record member.

47. The apparatus in accordance with claim 46 wherein said second means comprises a plurality of manually operable selection switches for generating a signal representative of a select one of said first codes, an electronic code-matching means, means for applying to said code-matching means said signals representative of said select first code generated by operating the selection switches, means for initiating said first means to read said first codes recorded on said record member to generate said corresponding location-indicating signals, means for applying said location-indicating signals to said electronic code-matching means, and means for generating a control signal when a match occurs between said location-indicating signals and said signals representative of said select first code.

48. The apparatus in accordance with claim 47 further comprising means for employing said control signal to cause said first means to read the discrete group of signals stored on said respective information-recording portion of said record member that corresponds to said select first code.

49. The apparatus in accordance with claim 46 further comprising means for selectively generating and recording at least one additional characteristic code associated with each discrete group of signals recorded on respective information-recording portions of said record member, said additional characteristic code being different from said first code in content and defining a characteristic of said associated discrete group of signals other than the location where said group is recorded on said record member.

50. The apparatus in accordance with claim 36 wherein the display of said third means comprises a television monitor.

51. The apparatus in accordance with claim 36 wherein the display of said third means comprises a video receiver.

52. The apparatus in accordance with claim 36 wherein the display of said third means comprises a monitor.

53. The apparatus in accordance with claim 36 wherein the display of said third means comprises a cathode ray tube.

54. A method of storing, reproducing and displaying information comprising:
storing information at a plurality of select storage locations of a storage means, and
when it is desired to visually monitor the information stored at a select location of said storage means, selectively reproducing the information stored at said select location and generating electrical signals representative of such recording,
passing said generated electrical signals to a further signal storage means and storing a representation of the information defined by said electrical signals in said further signal storage means,
thereafter employing said electrical signals stored in said further signal storage means to generate further electrical signals representative of the selectively reproduced information and repeatedly reproducing at a fixed frequency said further electrical signals, and
applying said repeatedly reproduced further electrical signals to a display having a viewing screen defined by a short persistence image generating means wherein the frequency at which said further electrical signals are generated and repeated is such as to effect the retention of an image on the viewing screen of said display by the repeated scanning of a phosphor image generating means thereof, which image is a visual representation of the information contained in the recording reproduced from the select storage location of said storage means.

55. The method in accordance with claim 54 wherein said step of storing information at a plurality of select storage locations includes storing the information as a plurality of discrete information recordings.

56. The method in accordance with claim 55 further comprising storing the discrete information recordings in the form of signals defining video information.

57. The method in accordance with claim 55 further comprising storing the discrete information recordings in the form of signals defining full frames of video information.

58. The method in accordance with claim 55 further comprising storing the discrete information recordings in the form of signals defining analog video information.

59. The method in accordance with claim 55 further comprising storing the discrete information recordings in the form of signals defining full frames of analog video information.

60. The method in accordance with claim 55 further comprising the step of deriving the discrete information recordings from the output of an electronic camera.

61. The method in accordance with claim 55 further comprising the step of deriving the discrete information recordings from the output of an electronic storage device.

62. The method in accordance with claim 54 wherein the step of applying said repeatedly reproduced further electrical signals to a display includes controlling an image generating means to display said image on a display screen of a television monitor.

63. The method in accordance with claim 54 wherein the step of applying said repeatedly reproduced further electrical signals to a display includes controlling an image generating means to display said image on a display screen of a monitor.

64. The method in accordance with claim 54 wherein the step of applying said repeatedly reproduced further electrical signals to a display includes controlling an image generating means to display said image on a display screen of a cathode ray tube.

65. A method for recording, reproducing and utilizing information signals comprising:
 (a) sequentially generating a series of groups of information signals, wherein each group of said signals comprises picture elements and code signal elements and wherein said code signal elements define respective locations of the recordings of respective of said picture elements,
 (b) recording said picture elements of each group as discrete frame-defining recordings along first select areas of a primary information recording portion of a magnetic recording member,
 (c) recording said code signal elements along select areas of a code recording portion of said magnetic recording member,
 (d) when it is required to reproduce and utilize selected of said picture elements, scanning said code recording portion of said magnetic recording member with a reproduction transducing means and generating coded electrical signals on the output of said transducing means, said coded electrical signals being derived from said code signal elements.
 (e) applying said coded electrical signals to a code matching electronic circuit,
 (f) selecting and generating an address code defining the location of said selected picture elements and applying said address code to said code matching electronic circuit,
 (g) when a match occurs at said code matching electronic circuit between said address code and one of said coded electrical signals generated by said transducing means, generating a control signal and applying same to control the reproduction of said selected picture elements from said recording thereof along said select portion of said magnetic recording member, and
 (h) applying the reproduced picture elements to a video display means to cause a display screen thereof to display the information defined by said select picture elements.

66. The method in accordance with claim 65 further comprising recording the picture elements in analog form.

67. The method in accordance with claim 65 wherein the step of recording the groups of information signals on a record member includes recording said groups on a magnetic disc.

68. The method in accordance with claim 65 further comprising deriving the picture elements from a full frame of video information.

69. The method in accordance with claim 65 wherein the step of recording said groups of information signals recorded on said record member includes recording said groups in the form of analog signals defining video information.

70. The method in accordance with claim 69 wherein the step of reproducing selected picture elements from said record member includes reproducing said elements in the form of analog signals defining video information.

71. A method for recording, reproducing and monitoring visual information comprising:
 (a) recording a plurality of discrete groups of information signals at a plurality of select recording locations of a record member;
 (b) when it is desired to generate and display information defined by a select one of said discrete groups of information signals, generating an address code to selectively reproduce said selected discrete group of information signals from its respective recording location of said record member;
 (c) employing said information signals to generate corresponding electrical signals:
 (d) recording said corresponding electrical signals in an erasable buffer memory;
 (e) automatically reproducing the recordings of said electrical signals in said erasable buffer memory at a predetermined fixed frequency as further electrical display signals defining image information;
 (f) applying said electrical display signals as they are generated to control the operation of a display means requiring restorative information signal scanning of a fixed rate in order to maintain on said display an image to be visually monitored.

72. The method in accordance with claim 71 wherein the step of recording said discrete groups of information signals on a record member includes recording said discrete groups on a magnetic disk.

73. The method in accordance with claim 71 wherein the step of recording said discrete groups of information signals on a record member includes recording said discrete groups on a magnetic tape.

74. The method in accordance with claim 71 wherein the step of recording said discrete groups of information signals on a record member includes recording said discrete groups in the form of electro-optically scannable information.

75. A method in accordance with claim 71 which further includes generating a plurality of location indicating codes each of which defines the location of a corresponding one of said discrete groups of said recorded information signals in said record member, recording said location indicating codes at select locations of a code recording portion of said record member, and thereafter effecting the reproduction of a selected one of said discrete groups of information signals from its recording location in said record member by: scanning said code recording portion of said record member and reproducing the codes recorded thereon as coded electrical signals, comparing said reproduced codes to said address code, and effecting the reproduction of said selected one of said discrete groups of said recorded information signals when said address code and said reproduced code matches.

76. The method in accordance with claim 75 further comprising manually generating said address code by operating a plurality of switches.

* * * * *